(12) United States Patent
Pan

(10) Patent No.: US 8,948,964 B2
(45) Date of Patent: Feb. 3, 2015

(54) VEHICLE CONTROL SYSTEM FOR MINIMIZING FUEL CONSUMPTION

(71) Applicant: Denso Corporation, Kariya, Aichi pref. (JP)

(72) Inventor: Liangchen Pan, Chiryu (JP)

(73) Assignee: Denso Corporation, Kariya (JP)

( * ) Notice: Subject to any disclaimer, the term of this patent is extended or adjusted under 35 U.S.C. 154(b) by 128 days.

(21) Appl. No.: 13/683,339

(22) Filed: Nov. 21, 2012

(65) Prior Publication Data

US 2013/0131919 A1    May 23, 2013

(30) Foreign Application Priority Data

Nov. 21, 2011  (JP) ................................. 2011-253976
Jul. 19, 2012  (JP) ................................. 2012-160768

(51) Int. Cl.
*G06F 19/00*  (2011.01)
*B60H 1/32*   (2006.01)

(52) U.S. Cl.
CPC ...... *B60H 1/3208* (2013.01); *B60H 2001/3266* (2013.01); *B60H 2001/327* (2013.01)
USPC ............................................ 701/36; 701/110

(58) Field of Classification Search
CPC .................... B60H 1/3208; B60H 2001/3266; B60H 2001/327
USPC ..................... 701/36, 102, 110, 123; 180/167
See application file for complete search history.

(56) References Cited

U.S. PATENT DOCUMENTS

| 5,924,406 A | 7/1999 | Kinugasa et al. |
|---|---|---|
| 2004/0093149 A1 | 5/2004 | Hara |
| 2006/0276937 A1 | 12/2006 | Yamashita |
| 2008/0319595 A1 | 12/2008 | Yamamoto et al. |

FOREIGN PATENT DOCUMENTS

| EP | 2 014 491 | 1/2009 |
|---|---|---|
| JP | 06-156055 | 6/1994 |
| JP | 2003-24609 | 11/2000 |
| JP | P2000-324609 A | 11/2000 |
| JP | 2005-207321 | 8/2005 |
| JP | 2009-29344 | 2/2009 |
| JP | 2010-030497 | 2/2010 |

OTHER PUBLICATIONS

Office Action (2 pages) dated Mar. 18, 2014, issued in corresponding Japanese Application No. 2012-160768 and English translation (2 pages).

*Primary Examiner* — Thomas Tarcza
*Assistant Examiner* — Kevin Myhre
(74) *Attorney, Agent, or Firm* — Nixon & Vanderhye PC

(57) ABSTRACT

A control unit of a vehicle control system estimates running-condition of a vehicle for a predetermined estimation period. A fuel-amount estimating portion estimates an engine condition related to a cooling efficiency, based on the estimated running condition. The control unit estimates multiple possible control patterns and calculates evaluation values related to the cooling efficiency for respective cases, in which a compressor is operated in accordance with each of the control patterns. The control unit selects one of control patterns to actually operate the compressor in accordance with the selected control pattern, so that fuel consuming amount can be reduced.

12 Claims, 17 Drawing Sheets

VEHICLE CONTROL SYSTEM FOR MINIMIZING FUEL CONSUMPTION

CROSS REFERENCE TO RELATED APPLICATION

This application is based on Japanese Patent Applications No. 2011-253976 filed on Nov. 21, 2011 and No. 2012-160768 filed on Jul. 19, 2012, the disclosures of which are incorporated herein by reference.

TECHNICAL FIELD

The present disclosure relates to a vehicle control system, according to which an operating condition of a driving source for a vehicle is estimated so as to optimize fuel consuming amount. The fuel consuming amount is necessary for the driving source to operate in-vehicle accessories, such as, an electric-power generator, a compressor for a vehicle air-conditioning apparatus and so on.

BACKGROUND

A vehicle control system is known in the art, for example, as disclosed in Japanese Patent Publication No. 2009-29344. According to the vehicle control system (JP No. 2009-29344), a time period is increased for a coast-lock-up operation and a fuel-cut operation in order to improve fuel consumption ratio. In addition, an operation of an air-conditioning apparatus is stopped during a vehicle acceleration period.

Another vehicle control system is known in the art, for example, as disclosed in Japanese Patent Publication No. 2009-12721. According to this prior art, a cool-storage device is provided in a vehicle air-conditioning apparatus and an operation of a compressor is controlled to be switched-on or switched-off in order to achieve a sufficient effect for reducing fuel consuming amount.

According to the above prior art (JP No. 2009-12721), a heat cost (g/kwh) is calculated. The heat cost is a fuel consuming amount necessary for generating a unit amount for heat of cooling (a unit amount for cooling energy) by an operation of a refrigerating cycle. The heat cost is compared with a threshold value and the compressor is operated when the heat cost is lower than the threshold value. Refrigerant discharged from the compressor is supplied to an evaporator and a cool-storage device, so that not only a passenger compartment of the vehicle is cooled down by the evaporator but also cooling energy of the refrigerant flowing from the evaporator to the cool-storage device is stored in the cool-storage device.

On the other hand, when the heat cost is higher than the threshold value, the operation of the compressor is stopped so that the refrigerant flows from the cool-storage device to the evaporator via a bypass passage until refrigerant pressure in a condenser becomes equal to that in the cool-storage device. As a result, the evaporator is continuously operated to cool down air passing through the evaporator.

A further vehicle control system is known in the art, for example, as disclosed in Japanese Patent Publication No. 2010-30497. According to such a prior art, cooling energy is stored in a cool-storage device not only in a vehicle acceleration period but also in a vehicle deceleration period. When supply of refrigerant from a compressor to the cool-storage device is stopped in the vehicle deceleration period, a braking distance of a vehicle may be increased or discomfort may be given to a vehicle passenger because a braking torque by the compressor disappears due to stop of the compressor operation. The above prior art discloses the vehicle control system for overcoming such problems.

In the above prior art, the compressor operation is stopped in the vehicle deceleration period, when the cooling energy is fully stored in the cool-storage device and thereby it becomes impossible to further store the cooling energy in the cool-storage device. When such a situation occurs, a control signal is transmitted from a control unit of the air-conditioning apparatus to a control unit for an automatic transmission apparatus so as to increase a reduction gear ratio of a stepless-speed-change device. As a result, a portion of the vehicle decelerating torque, which is coming short due to the stop of the compressor operation, is compensated.

A still further vehicle control system is known in the art, for example, as disclosed in Japanese Patent Publication No. 2005-207321. The patent document discloses the vehicle control system, according to which cooling energy stored in a cool-storage device is effectively used. In addition, according to the vehicle control system, an engine for a vehicle and an air-conditioning apparatus are cooperatively and totally controlled.

Furthermore, according to the prior art (JP No. 2005-207321), the vehicle control system is composed of;

the cool-storage device for storing at least a portion of the cooling energy generated by the air-conditioning apparatus;

a cooling-energy amount detecting sensor for detecting a stored amount of the cooling energy in the cool-storage device;

a vehicle-condition detecting portion for detecting an environmental condition of the vehicle (such as, inside temperature, inside humidity, outside temperature, amount of solar radiation, preset temperature for the air-conditioning apparatus and son);

a cooling-energy calculating portion for calculating an amount of cooling energy necessary for cooling a passenger compartment of the vehicle based on detected information from the vehicle-condition detecting portion; and a control portion for controlling an operating condition of the vehicle based on the stored amount of the cooling energy in the cool-storage device and the amount of the cooling energy necessary for the air-conditioning operation.

According to the above prior art (JP No. 2009-29344), the vehicle control system aims to reduce the fuel consuming amount for cooling operation by increasing discharge amount of the refrigerant from the compressor when the vehicle control system estimates the vehicle decelerating operation. Cooling efficiency (an inverse number of the heat cost) is related to not only the vehicle condition of the accelerating operation but also engine rotational speed, output torque, capacity of the compressor, flow rate of the refrigerant, refrigerant pressure and so on. Even when the discharge amount of the refrigerant is increased in the case of the estimation for the vehicle decelerating operation, the cooling efficiency of the air-conditioning apparatus may be low depending on various vehicle condition and other circumstances. Therefore, the fuel consumption ratio may be adversely affected in some of the cases.

In addition, effect for reducing the fuel consuming amount in the vehicle decelerating period by increasing the discharge amount of the refrigerant from the compressor is related to not only the cooling efficiency in the vehicle decelerating operation but also an average cooling efficiency of a whole operating period of the air-conditioning apparatus. In other words, if the discharge amount of the refrigerant is increased in the vehicle decelerating period and if the cooling efficiency during such operation is lower than the average cooling efficiency, the fuel consumption ratio may be adversely affected.

When the cool-storage device is provided, a total amount for storing the heat of cooling (the cooling energy) is increased in the air-conditioning apparatus. In such an air-conditioning apparatus, the stored cooling energy is radiated when the cooling efficiency is low, so that the fuel consuming amount can be reduced. In other words, when the air-conditioning apparatus is operated in such a way that the cooling energy is stored in the cool-storage device only in the period of the fuel-cut operation or in the vehicle decelerating operation, the effectiveness for reducing the fuel consuming amount cannot be sufficiently increased.

None of the above prior arts (JP No. 2009-12721, JP No. 2010-30497, JP No. 2005-207321) does disclose how to further improve the fuel consumption ratio.

When an alternator, which is driven by the engine, is provided in the vehicle as one of accessory devices, the fuel consumption ratio may be likewise adversely affected unless the operation of the alternator is properly controlled.

SUMMARY OF THE DISCLOSURE

The present disclosure is made in view of the above problems. It is an object of the present disclosure to provide a vehicle control system, according to which fuel consuming amount for an accessory device (such as, a compressor, an alternator and so on) of a driving source (for example, an engine) can be reduced. According to the present disclosure, vehicle running condition (including accelerating and decelerating operation) is estimated not only for a specific vehicle condition but for a normal vehicle condition. A fuel consumption ratio (or a fuel consuming amount) of the driving source as well as operation efficiency of the accessory device is estimated based on the above estimated vehicle running condition. And most appropriate control pattern for the accessory device is selected.

According to a feature of the present disclosure, a vehicle control system for controlling a driving source of a vehicle has following portions:

a running-condition estimating portion for estimating a running condition of the vehicle for a predetermined estimation period based on information related to vehicle condition;

a driving-amount calculating portion for calculating an amount of driving power necessary for the driving source in order to operate an accessory device with the driving power;

an accessory-device controlling portion for controlling an operation of the accessory device; and a control-pattern calculating portion for calculating a control pattern for the accessory device and controlling the accessory-device controlling portion in accordance with the control pattern.

In the above structure, the control pattern is calculated based on;

(i) characteristic data showing a relationship between the driving power of the driving source and a fuel consuming amount;

(ii) information from the running-condition estimating portion; and (iii) information from the driving-amount calculating portion.

In addition, in the above structure, the fuel consuming amount of the driving source is minimized for the predetermined estimation period, when the accessory device is operated in accordance with the control pattern calculated by the control-pattern calculating portion.

According to the above feature, the vehicle running condition is estimated not only in a specific condition (such as, a running condition shortly before vehicle deceleration) but also in a normal condition, for a predetermined estimation period. The control pattern, which has a high operation efficiency for the accessory device, is calculated and/or selected depending on the estimated vehicle running condition. The accessory device is operated in accordance with such control pattern, so that fuel consuming amount for operating the accessory device can be minimized for almost all operating period of the accessory device. As a result, fuel consumption ratio for a driving source (such as, an engine) can be largely improved.

According to another feature of the present disclosure, the vehicle control system further has an accessory-condition detecting portion for detecting a condition of the accessory device or an accessory system, wherein the driving-amount calculating portion is composed of an efficiency estimating portion for estimating operation efficiency of the driving source or an energy-consuming amount estimating portion for estimating an energy consuming amount of the driving source, based on the information from the running-condition estimating portion as well as a condition of the driving source.

The control-pattern calculating portion calculates the control pattern for the accessory device based on;

(iv) the operation efficiency of the driving source estimated by the efficiency estimating portion or the energy consuming amount of the driving source estimated by the energy-consuming amount estimating portion; and (v) information from the accessory-condition detecting portion for the condition of the accessory device or the accessory system.

As a result, the energy consuming amount of the driving source is minimized for the predetermined estimation period, when the accessory device is operated in accordance with the control pattern.

According to a further feature of the present disclosure, the efficiency estimating portion or the energy-consuming amount estimating portion of the driving-amount calculating portion has a fuel-consuming amount estimating section for estimating the fuel consuming amount necessary for operating the accessory device based on the information from the running-condition estimating portion.

The vehicle control system further comprises an operation-efficiency calculating section for calculating operation efficiency of the accessory device based on the fuel consuming amount estimated by the fuel-consuming amount estimating section.

The control-pattern calculating portion calculates the control pattern based on the operation efficiency of the accessory device, so that the fuel consuming amount of the driving source is minimized when the accessory device is operated in accordance with the control pattern.

According to the above feature, since the operation efficiency of the accessory device is calculated based on the fuel consuming amount estimated by the fuel-consuming amount estimating section, it is possible to increase accuracy for minimizing the fuel consuming amount.

According to a still further feature of the present disclosure, the control-pattern calculating portion is composed of;

a control-pattern estimating portion for estimating multiple possible control patterns;

a threshold-value calculating portion for calculating threshold values based on the information from the accessory-condition detecting portion for the condition of the accessory device or the accessory system, wherein the threshold values are related to the operation efficiency of the accessory device or the accessory system; and a selecting portion for selecting one control pattern for the accessory device from the multiple possible control patterns based on the threshold value.

According to such a feature, it is possible to estimate multiple possible control patterns, to calculate threshold values based on the information for the condition of the accessory device or the accessory system (wherein the threshold values are related to the operation efficiency of the accessory device or the accessory system), and to select one control pattern for the accessory device from the multiple possible control patterns based on the threshold value.

According to a still further feature of the present disclosure, the selecting portion has a comparing section for comparing a value related to an operation efficiency of the accessory device for each of the multiple possible control patterns with the threshold value.

The accessory device is operated in accordance with the selected control pattern in order to increase output of the accessory device, when the vehicle control system determines through the comparison between the value related to the operation efficiency of the accessory device and the threshold value that the fuel consuming amount becomes smaller in a case in which the accessory device is operated in accordance with the selected control pattern.

According to the above feature, the output of the accessory device is increased when the value related to the operation efficiency of the accessory device is larger than the threshold value. It is, therefore, possible to calculate with a smaller calculating amount the control pattern for the accessory device, according to which the fuel consuming amount is minimized.

According to a still further feature of the present disclosure, the comparing section selects the control pattern depending on a difference between the value related to the operation efficiency of the accessory device and the threshold value.

According to the above feature, the control pattern is selected depending on the difference between the value related to the operation efficiency of the accessory device and the threshold value. It is, therefore, possible to select such a control pattern, according to which the work volume of the accessory device will be increased in the predetermined operational period, when the operation efficiency of the accessory device is estimated to become increased. Since the output of the accessory device can be positively utilized when the accessory device is operated at the high efficiency, it is possible to realize the operation having a large effect for reducing the fuel consuming amount.

According to a still further feature of the present disclosure, the comparing section calculates a first energy consuming amount necessary for operating the accessory device so that the accessory device is operated with such operation efficiency related to the threshold value, the comparing section calculates a second energy consuming amount for each of the multiple possible control patterns, based on the value related to the operation efficiency of the accessory device, and the comparing section calculates a third energy consuming amount, which can be saved for each of the multiple possible control patterns, based on the first and second energy consuming amounts.

And the comparing section selects such control pattern, which has a maximum value for the third energy consuming amount which can be saved.

According to the above feature, it is possible to calculate the third energy consuming amount to be saved, based on the first energy consuming amount related to the threshold value and the second energy consuming amount related to the operation efficiency of the accessory device. It is, therefore, possible to evaluate and select the control patterns with a higher accuracy, so as to minimize the energy consuming amount.

According to a still further feature of the present disclosure, the threshold value is calculated based on at least one of;
    an accumulated amount of energy outputted from the accessory device,
    a vehicle condition related to use of energy outputted from the accessory device, and
    environmental condition related to use of energy outputted from the accessory device.

According to the above feature, at least one of the following values or information is taken into consideration when calculating the control pattern;
    the accumulated amount of energy (for example, the stored amount of cooling energy, the battery SOC);
    the vehicle condition related to use of energy outputted from the accessory device (for example, the preset temperature, the electric power consuming amount); and
    the environmental condition related to use of energy outputted from the accessory device (for example, the outside temperature, the rain).

As a result, the minimization of the energy consuming amount and the comfortable driving go together.

According to a still further feature of the present disclosure, the threshold-value calculating portion learns records related to energy outputted from the accessory device, so as to calculate the threshold values.

According to the above feature, the threshold-value calculating portion sets the threshold value depending on the past records for the threshold values. For example, the threshold value is made smaller as the past energy consuming amount was smaller. Since it is possible to set the threshold value as the value more exactly reflecting the actual situation, the fuel consuming amount can be more effectively reduced. In addition, since it is possible to correctly set the threshold value even when the operational condition of the vehicle or the place of destination for the vehicle is different from vehicle to vehicle, the fuel consumption ratio can be surely improved.

According to a still further feature of the present disclosure, the control-pattern calculating portion is composed of;
    a provisional-work-volume calculating portion for calculating a provisional work volume of the accessory device based on;
        the information from the accessory-condition detecting portion for the condition of the accessory device or the accessory system, and
        the information from the driving-amount calculating portion for the operation efficiency of the driving source or the energy consuming amount of the driving source;
    an accessory-driving-power amount calculating portion for calculating a driving-power amount of the driving source necessary for operating the accessory device so as to generate the provisional work volume and for calculating the operation efficiency of the accessory device related to the provisional work volume; and
    a corrected work-volume calculating portion for correcting the provisional work volume of the accessory device by use of the operation efficiency of the accessory device, so as to calculate a corrected work volume of the accessory device as the control pattern.

According to the above feature, it is possible to calculate the provisional work volume of the accessory device based on the information for the condition of the accessory device or the accessory system and the information for the operation efficiency or the energy consuming amount of the driving source. It is further possible to calculate the driving-power amount of the driving source necessary for operating the accessory device so as to generate the provisional work volume and the operation efficiency of the accessory device related to the provisional work volume. It is, then, possible to correct the provisional work volume of the accessory device by use of the operation efficiency of the accessory device, so as to calculate the corrected work volume of the accessory device as the control pattern. The accessory device is operated in accordance with the corrected control patter so as to minimize the energy consuming amount.

According to a still further feature of the present disclosure, the efficiency estimating portion estimates the operation efficiency of the driving source for the predetermined estimation period, based on the information from the running-condition estimating portion as well as the condition of the driving source, and an average value of the operation efficiency of the driving source is calculated by an average-value calculating portion for the predetermined estimation period.

The provisional-work-volume calculating portion calculates the provisional work volume of the accessory device based on;
 the operation efficiency of the driving source for the predetermined estimation period,
 the average value of the operation efficiency of the driving source for the predetermined estimation period, and
 the information from the accessory-condition detecting portion for the condition of the accessory system.

The accessory-driving-power amount calculating portion calculates the driving-power amount of the driving source necessary for operating the accessory device so as to generate the provisional work volume and calculates the operation efficiency of the accessory device related to the provisional work volume.

The corrected work-volume calculating portion corrects the provisional work volume of the accessory device by use of the operation efficiency of the accessory device, so as to calculate the corrected work volume of the accessory device as the control pattern.

According to the above feature, the efficiency estimating portion estimates the operation efficiency of the driving source for the predetermined estimation period, and the average-value calculating portion calculates the average value of the operation efficiency of the driving source.

The provisional-work-volume calculating portion calculates the provisional work volume based on;
 the operation efficiency of the driving source for the predetermined estimation period,
 the average value of the operation efficiency of the driving source for the predetermined estimation period, and
 the information for the condition of the accessory system.

The accessory-driving-power amount calculating portion calculates the driving-power amount of the driving source necessary for operating the accessory device so as to generate the provisional work volume and calculates the operation efficiency of the accessory device related to the provisional work volume.

The corrected work-volume calculating portion corrects the provisional work volume by use of the operation efficiency, so as to calculate the corrected work volume of the accessory device as the control pattern.

Accordingly, it is possible to simply obtain the control pattern, which corresponds to the work volume of the accessory device, without setting multiple possible control patterns in advance.

According to a still further feature of the present disclosure, the control-pattern calculating portion is composed of;
 a control-pattern estimating portion for estimating multiple possible control patterns; and
 a selecting portion for selecting one control pattern for the accessory device or the accessory system from the multiple possible control patterns based on;
  the information from the accessory-condition detecting portion for the condition of the accessory device or the accessory system, and
  the information for the operation efficiency of the accessory device or the accessory system.

According to the above feature, the multiple possible control patterns are set in advance, while the threshold values are not used. It is possible to select one control pattern from the multiple control patterns in a simplified manner.

According to a still further feature of the present disclosure, the selecting portion selects the control pattern based on;
 the information for the operation efficiency,
 a value related to a required energy amount of the accessory system, wherein the required energy amount corresponds to the information for the condition of the accessory system, and
 output of the accessory device.

According to the above feature, the multiple possible control patterns are set in advance, while the threshold values are not used. One of the control patterns, which has a high operation efficiency, is selected from the multiple control patterns by taking into consideration the following information and/or value;
 the information for the operation efficiency,
 the value related to the required energy amount of the accessory system, and
 the output of the accessory device.

According to a still further feature of the present disclosure, the accessory device is composed of a compressor of an air-conditioning apparatus, wherein the air-conditioning apparatus corresponds to the accessory system. The selecting portion selects the control pattern based on;
 an inverse number of estimated heat cost, which corresponds to the information related to the operation efficiency,
 a preset temperature and an air-blowing temperature of the air-conditioning apparatus, wherein the preset temperature and the air-blowing temperature are related to the required energy amount, and
 an amount of heat of cooling, which corresponds to the output of the accessory device.

According to the above feature, it is possible to select the control pattern having the high operation efficiency by taking into consideration the following information of the air-conditioning apparatus, without using the threshold values;
 the preset temperature,
 the air-blowing temperature, and
 the amount of heat of cooling.

According to a still further feature of the present disclosure, a work-volume change-rate is set as such a value, which has an influence on drivability of the vehicle, or which has an influence on a life-time of the accessory device and/or the accessory system, and the control pattern is decided depending on the work-volume change-rate.

According to the above feature, an engineer (a car designer) can select one of the following systems at his discretion by setting the work-volume change-rate;

the vehicle control system for which drivability of the vehicle is more emphasized, the vehicle control system for which life duration of the vehicle is more emphasized, and the vehicle control system for which fuel consumption ratio is more emphasized.

Accordingly, it is possible to optimize trade-off between the drivability and the fuel consumption ratio.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
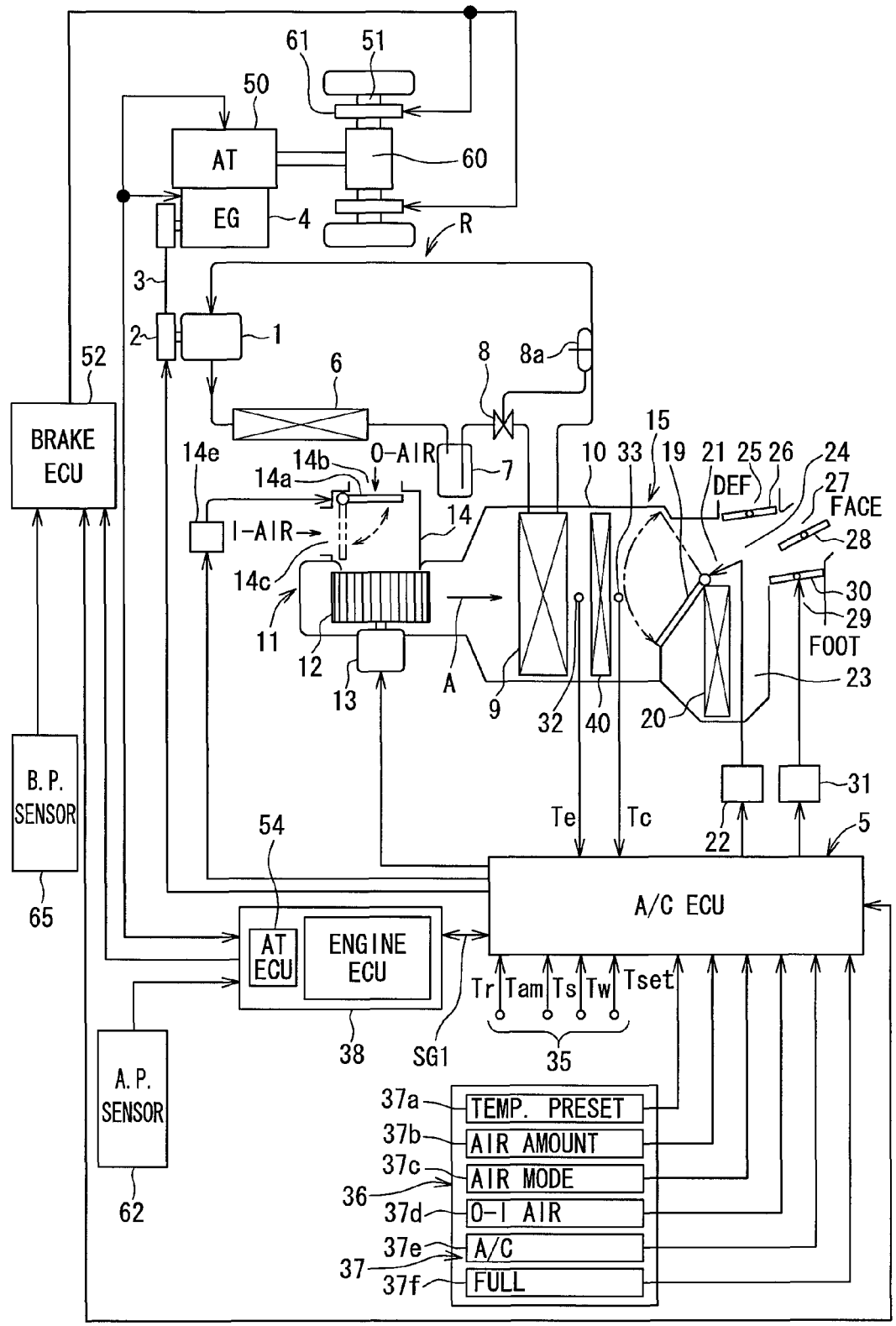
FIG. 1 is a schematic view showing a system structure for a vehicle control system according to a first embodiment of the present disclosure, including an air-conditioning apparatus and a brake control apparatus for a vehicle.

The present disclosure will be explained by way of multiple embodiments with reference to the drawings. The same reference numerals are used throughout the embodiments for the purpose of designating the same or similar parts and components, so as to avoid repeated explanation.

First Embodiment

A first embodiment of the present disclosure will be explained with reference to FIGS. 1 to 8. FIG. 1 shows a system structure for a vehicle control system according to a first embodiment of the present disclosure, including an air-conditioning apparatus and a brake control apparatus for a vehicle. In the present embodiment, a cool-storage device 40 is provided in the air-conditioning apparatus 15 (hereinafter, A/C apparatus 15), a refrigerating cycle R of which is operated by a variable-capacity type compressor 1. A continuously variable transmission (CVT) apparatus is used as a transmission apparatus 50.

The A/C apparatus 15 for a vehicle will be explained at first. The compressor 1 is provided in the refrigerating cycle R for withdrawing, compressing and discharging refrigerant. The compressor 1 is of the variable-capacity type, so that flow amount of the refrigerant is continuously controlled in accordance with control current from an air-conditioner control unit 5 (hereinafter, A/C ECU 5).

A driving force is transmitted from an engine 4 for the vehicle to the compressor 1 via a pulley 2 and a belt 3. High-temperature and high-pressure refrigerant (superheated gaseous refrigerant) discharged from the compressor 1 flows into a condenser 6, so that the refrigerant is heat-exchanged with outside air blown by a cooling fan (not shown) and passing through the condenser 6. The refrigerant is thereby cooled down and condensed. The refrigerant condensed in the condenser 6 flows into a receiver 7, in which gas-phase refrigerant and liquid-phase refrigerant are separated from each other. Surplus refrigerant (that is, the liquid-phase refrigerant) in the refrigerating cycle R remains in the receiver 7 and is accumulated therein.

The refrigerant from the receiver 7 is de-pressurized by an expansion valve 8 to a low-pressure refrigerant, so that the refrigerant becomes to low-pressure two-phase (gas-phase and liquid-phase) refrigerant. The expansion valve 8 is a temperature sensing type valve having a temperature sensing portion 8a, which senses temperature of the refrigerant discharged from an evaporator 9 (a heat exchanger for cooling down air). The low-pressure refrigerant from the expansion valve 8 flows into the evaporator 9.

The evaporator 9 is arranged in an air-conditioning casing 10 (hereinafter, an A/C casing 10) of the A/C apparatus 15. The low-pressure refrigerant flowing into the evaporator 9 is vaporized by absorbing heat from the air in the A/C casing 10. An outlet of the evaporator 9 is connected to an inlet side of the compressor 1. The refrigerant cycle R forms a closed circuit being composed of the above components.

A blower device 11, which is composed of a centrifugal blower fan 12 and a driving motor 13, is provided in the A/C casing 10 at an upstream side of the evaporator 9. An inside-outside air switching unit 14 is provided at an inlet side of the blower fan 12, so that an air switching door 14a provided in the air switching unit 14 selectively opens and/or closes an outside-air inlet port 14b and an inside-air inlet port 14c.

According to the above structure, outside air (air from an outside of the vehicle) or inside air (air from an inside of the vehicle) is selectively introduced into the air switching unit 14. The air switching door 14a is driven by an electric driving device 14e, such as a servomotor.

The cool-storage device 40 (explained below) and an air-mix door 19 are arranged in the A/C casing 10 at a downstream side of the evaporator 9. A heat exchanger 20 (a hot-water heater core) is arranged in the A/C casing 10 at a downstream side of the air-mix door 19 for heating air by heat of hot water (engine cooling water) for the engine 4.

A bypass air passage 21 is formed in the A/C casing 10 at a side of the heater core 20 (at an upper side thereof in the drawing), so that cold air passing through the evaporator 9 bypasses the heater core 20. The air-mix door 19 is a plate-type door driven by an electric driving device 22 being composed of a servomotor.

The air-mix door 19 controls an air-flow ratio between hot air passing through the heater core 20 and the cold air passing through the bypass air passage 21, so as to control temperature of the air blown into a passenger compartment of the vehicle. In the present embodiment, therefore, the air-mix door 19 corresponds to a temperature control unit for the air to the passenger compartment.

A hot-air passage 23 is formed in the A/C casing 10 at the downstream side of the heater core 20, wherein the hot-air passage 23 extends from a lower side toward an upper side. The hot air passing through the hot-air passage 23 and the cold air passing through the bypass air passage 21 are mixed with each other in an air-mixing space 24, so that the temperature of the air is controlled at a desired value.

An air-blowing-mode switching portion is formed in the A/C casing 10 at a downstream side of the air-mixing space 24. A defroster opening 25 is formed at an upper side of the A/C casing 10. The air is blown into the passenger compartment through a defroster duct (not shown), wherein the air flows into the defroster duct from the defroster opening 25 and the air is blown to a front windshield of the vehicle. The defroster opening 25 is opened and/or closed by a plate-type defroster door 26, which is pivotally provided at the defroster opening 25.

A face opening 27 is likewise formed at the upper side of the A/C casing 10 but in such a position displaced from the defroster opening 25 in a direction to a vehicle rear side. The air is blown into the passenger compartment through a face duct (not shown), wherein the air flows into the face duct from the face opening 27 and the air is blown toward an upper body of a vehicle driver or a passenger. The face opening 27 is opened and/or closed by a plate-type face door 28, which is pivotally provided at the face opening 27.

A foot opening 29 is further formed at the upper side of the A/C casing 10 but in such a position below the face opening 27. The air is blown into the passenger compartment toward a foot portion of the vehicle driver or the passenger. The foot opening 29 is opened and/or closed by a plate-type foot door 30, which is pivotally provided at the foot opening 29.

A temperature sensor 32 of the evaporator 9 is arranged in the A/C casing 10 at a position, which is a direct downstream side of air-passing portion for the evaporator 9, in order to detect temperature "Te" of the air passing through the evaporator 9 (hereinafter an evaporator temperature "Te"). A temperature sensor 33 for the cool-storage device 40 is arranged in the A/C casing 10 at a downstream side of the cool-storage device 40 so as to detect temperature "Tc" of the air passing through the cool-storage device 40 (hereinafter a cool-storage temperature "Tc").

In a similar manner to an ordinary air-conditioning apparatus, discharge amount of the compressor 1 (of the variable-capacity type) is adjusted based on a detection signal of the temperature sensor 32 (that is, the evaporator temperature "Te"), so that the evaporator temperature "Te" is controlled at a target evaporator temperature "TEO".

A detection signal of the temperature sensor 33 for the cool-storage device 40 (that is, the cool-storage temperature "Tc") is used for controlling an opening degree of the air-mix door 19. Namely, an opening position of the air-mix door 19 is corrected by the cool-storage temperature "Tc".

The A/C apparatus 15 has multiple well-known sensors 35 for detecting inside-air temperature "Tr", outside-air temperature "Tam", amount of solar radiation "Ts", hot-water temperature "Tw" (temperature of the engine cooling water) and so on. Detection signals from the sensors 35 are inputted to the A/C ECU 5, in addition to the detection signals from the temperature sensor 32 for the evaporator 9 as well as the temperature sensor 33 for the cool-storage device 40, so as to control an air-conditioning operation. Operation switches 37 operated by the vehicle driver or the passenger are provided in an air-conditioner control panel 36, which is arranged at a position close to an instrument panel of the vehicle. Operation signals of these operation switches 37 are also inputted to the A/C ECU 5.

The operation switches 37 include a switch 37a for generating a signal for a preset temperature "Tset" (a temperature presetting switch 37a), a switch 37b for generating an air-flow amount changing signal (an air-flow changing switch 37b), a switch 37c for generating an air-blowing mode signal (an air-blowing mode switch 37c), a switch 37d for generating an inside-outside-air changing signal (an inside-outside-air switch 37d), a switch 37e for generating a signal for turning on or turning off the compressor 1 (an A/C switch 37e), a switch 37f for generating a full-operation signal (a full A/C switch 37f), and so on.

When the full A/C switch 37f is turned on, not only the signal for turning on the compressor 1 is outputted but also a signal for continuing an operation of the engine 4 is outputted. Therefore, the engine operation is continued even when the vehicle temporally stops. On the other hand, in a case that the A/C switch 37e is turned on, only the signal for turning on the compressor 1 is outputted. Namely, no signal for continuing the engine operation is outputted.

The A/C ECU 5 is connected to an engine control unit 38 (hereinafter an engine ECU 38), so that signals "SG1" for engine rotational speed, vehicle speed, an operational amount of an acceleration pedal and so on are inputted from the engine ECU 38 to the A/C ECU 5.

As well known in the art, the engine ECU 38 totally controls the engine operation (including fuel injection amount, ignition timing and so on for the engine 4) based on detection signals from various kinds of sensors (not shown). The engine ECU 38 further controls the automatic transmission apparatus 50. In addition, in case of an economy-running vehicle (having an idling-stop function, for example), a hybrid vehicle or the like, the engine ECU 38 stops electric power supply to an ignition device, terminates fuel injection and the like so as to automatically stop the engine operation, when the engine ECU 38 determines that the vehicle has stopped based on the signal for the engine rotational speed, the signal for the vehicle speed, the signal for braking operation and so on. The above operation (the engine stop operation) is carried out only when the full A/C switch 37f is not turned on.

When the acceleration pedal is operated by the vehicle driver so as to move the vehicle after the engine operation is temporally stopped, the engine ECU 38 determines whether the vehicle is about to move, based on an acceleration signal from an acceleration pedal sensor 62. Then, the engine ECU 38 automatically re-starts the operation of the engine 4. In a case that the full A/C switch 37f is turned on, the A/C ECU 5 outputs the signal for continuing the engine operation, based on an increase of the cool-storage temperature "Tc" after the temporal stop of the engine operation.

When the signal is outputted from the A/C ECU 5 for increasing driving power to the compressor 1, or when it is estimated that such power-increase signal will be outputted from the A/C ECU 5, the A/C ECU 5 demands the engine ECU 38 to increase engine output. The engine ECU 38 carries out a cooperative control so as to increase the engine output. The demand for increasing the engine output is carried out from the A/C ECU 5 to the engine ECU 38 by use of CAN communication.

Each of the A/C ECU 5 and the engine ECU 38 is composed of a well known micro-computer (having CPU, ROM, RAM and so on) and peripheral circuits. The A/C ECU 5 is composed of a signal output portion for outputting a control signal for stopping the operation of the engine 4, a control signal for prohibiting the stop of the engine operation, a control signal for re-starting the engine operation after the temporal stop of the engine operation and so on. The A/C ECU 5 is further composed of; a capacity control portion for controlling the capacity of the compressor 1; an inside-outside air control portion for selecting the inside or the outside air by the air switching door 14a; a flow rate control portion for the blower device 11; a temperature control portion by the air-mix door 19; an air-blowing mode control portion by switching on-off conditions of the openings 25, 27 and 29; and so on.

In FIG. 1, the driving force of the engine 4 is transmitted to an axle 51 via the automatic transmission apparatus 50 and a differential gear 60. The automatic transmission apparatus 50 changes a speed reducing ratio (a change gear ratio) in accordance with the signal from the engine ECU 38. The acceleration pedal sensor 62 is provided for the acceleration pedal (not shown), which is operated by the vehicle driver, and the acceleration signal from the acceleration pedal sensor 62 is inputted to the engine ECU 38.

A brake pedal sensor 65 is provided for a brake pedal (not shown), which is operated by the vehicle driver so as to decelerate the vehicle. A brake signal from the brake pedal sensor 65 is inputted to a brake ECU 52. The brake ECU 52 controls hydraulic pressure of braking oil, which is applied to a brake actuator 61 provided at a position close to the axle 51.

The automatic transmission apparatus 50 is controlled by a transmission control portion 54, which is formed in the engine ECU 38 and composed of a micro-processor and so on. The output of the automatic transmission apparatus 50 is transmitted to the axle 51 via the differential gear 60.

Figure 2:
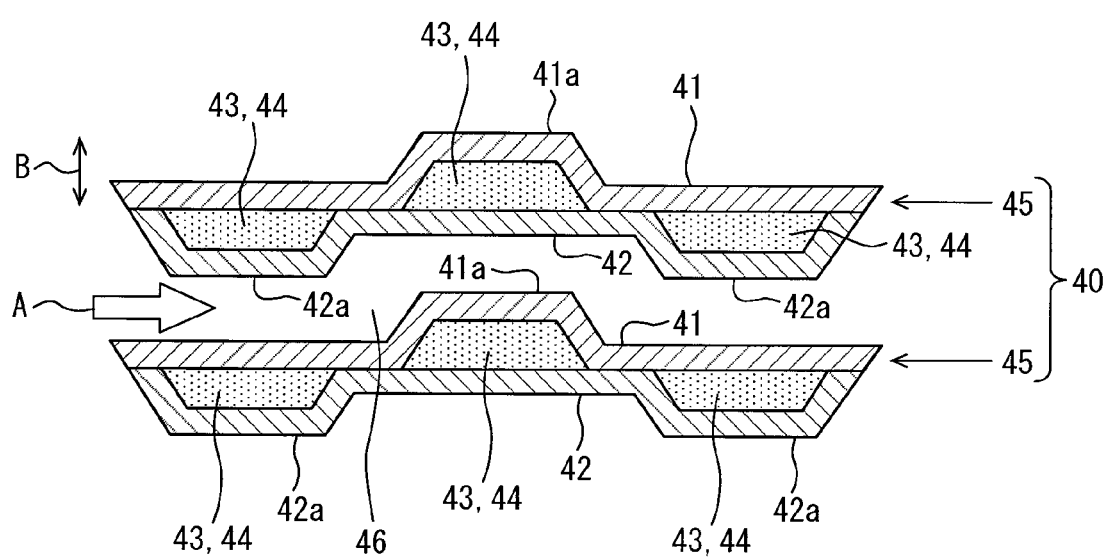
FIG. 2 is a schematic cross-sectional view showing a part of a cool-storage device, which is applied to the vehicle control system of the first embodiment.

FIG. 2 is a cross-sectional view showing a part of the cool-storage device 40 used in the A/C apparatus 15 of the first embodiment. A detailed structure of the cool-storage device 40 will be explained with reference to FIGS. 1 and 2. The cool-storage device 40 has a heat-exchange structure having a front side surface, an area of which is almost equal to that of a rear side surface of the evaporator 9, as shown in FIG. 1, so that all of the air (all of the cold air in the A/C casing 10) having passed through the evaporator 9 passes through the cool-storage device 40. According to such an arrangement, a thickness of the cool-storage device 40 can be made smaller in a direction A of the air-flow in the A/C casing 10.

FIG. 2 shows an example of the heat-exchange structure of the cool-storage device 40. Convex portions 41a and 42a are alternately formed in a pair of heat-exchange plates 41 and 42 in the direction A of the air-flow (the direction A of the cold air). Flat plate portions of each heat-exchange plate 41, 42 is brought into contact with the other heat-exchange plate 41, 42 at surrounding areas for the convex portions 41a and 42a and those contacting portions are soldered to each other. As a result, multiple tubes 45 are formed, wherein closed spaces 43 are formed at respective inner sides of the convex portions 41a and 42a and cool-storage material 44 is filled in each of the closed spaces 43.

Although only two tubes 45 are shown in FIG. 2, multiple tubes 45 are built up in a direction B (perpendicular to the direction A of the air-flow) indicated in FIG. 2, so that the front side surface of the cool-storage device 40 has the surface area equal to that of the rear side surface of the evaporator 9.

A pair of connecting members (not shown) is provided at an upside end and at a downside end of the respective tubes 45, so that the respective tubes 45 are arranged at equal intervals in the direction B to form air passages 46 between the respective neighboring tubes 45. The connecting members and the heat-exchange plates 41 and 42 (the upside and downside ends of the tubes 45) are soldered to each other, to integrally form the cool-storage device 40 as one heat-exchange structure.

An operation of the A/C apparatus 15 of the present embodiment will be explained. In FIG. 1, when the compressor 1 is driven by the engine 4, the refrigerating cycle R is operated. The low-temperature and low-pressure refrigerant of the two-phase (the liquid-phase and the gas-phase), which is depressurized by the expansion valve 8, flows into the evaporator 9. Then, the refrigerant absorbs heat from the air from the blower device 11, so that the low-pressure refrigerant is vaporized. The air from the blower device 11 is cooled down and dehumidified to produce the cold air.

The temperature of the evaporator 9 is maintained at the target evaporator temperature "TEO" by controlling the operation of the variable-capacity type compressor 1. As explained below, the target evaporator temperature "TEO" is decided depending on a selected operational mode of the A/C apparatus 15 (hereinafter, an A/C operational mode). The target evaporator temperature "TEO" is set at a value higher than 0° C. so as to prevent frost of the evaporator 9.

The cold air formed by and having passed through the evaporator 9 then flows into the multiple air passages 46 formed between the respective tubes 45. As shown in FIG. 2, the air passage 46 is formed in a snaking (jig-zag) shape. The flow of the cold air is thereby disturbed to increase heat transfer coefficient, so that the cool-storage material 44 can be effectively cooled down via the heat-exchange plates 41 and 42 when the cold air passes through the air passages 46.

In the A/C apparatus 15, the air from the blower device 11 is at first cooled down and dehumidified by the evaporator 9, and then the opening degree of the air-mix door 19 is adjusted so as to control a mixing ratio between the cold air and the hot air. As above, a target air-blowing temperature "TAO" (a target temperature of the air blowing into the passenger compartment) is controlled. It is necessary to set the target evaporator temperature "TEO" at a value, as low as possible, in order to complete an operation for storing cooling energy in the cool-storage material 44 in a short time period, even in a case the air-blowing temperature "TAO" is set at a relatively high value, for example, 12° C.

(Control of the A/C ECU)

A control of the A/C ECU 5 of the present embodiment will be explained. The control of the A/C ECU 5 is started, when the A/C switch 37e of the A/C control panel 36 (shown in FIG. 1) is turned on, in the circumstances that an ignition switch is turned on for the engine 4 and electric power is supplied to the A/C ECU 5. At first, flags and timers or the like are initialized. Then, the A/C ECU 5 reads the detection signals from the sensors, the operation signals from the operation switches, a vehicle operating signal (the signal for the operational amount of the acceleration pedal) from the engine ECU 38 and so on.

Then, the A/C ECU 5 calculates the target air-blowing temperature "TAO" (the target temperature of the air blowing into the passenger compartment). The target air-blowing temperature "TAO" corresponds to such an air-blowing temperature, which is necessary to maintain the preset temperature "Tset" (which is set by the vehicle driver) even when a condition of a heat load for the air-conditioning operation is changed. The target air-blowing temperature "TAO" is calculated in accordance with the following formula 1:

$$TAO = Kset \times Tset - Kr \times Tr - Kam \times Tam - Ks \times Ts + C \quad \text{(Formula 1)}$$

In the above formula 1, "Tr" is the inside-air temperature detected by an inside-air temperature sensor; "Tam" is the outside-air temperature detected by an outside-air temperature sensor; "Ts" is the amount of the solar radiation detected by a solar sensor; "Kset", "Kr", "Kam" and "Ks" are control gains; "C" is a constant number for correction. As is well known in the art, the target air-blowing temperature "TAO" is used for controlling the respective doors (26, 28, 30) of the air-blowing openings, for controlling the position of the air-mix door 19 and so on.

(Block Structure for the Vehicle Control System)

Figure 3:
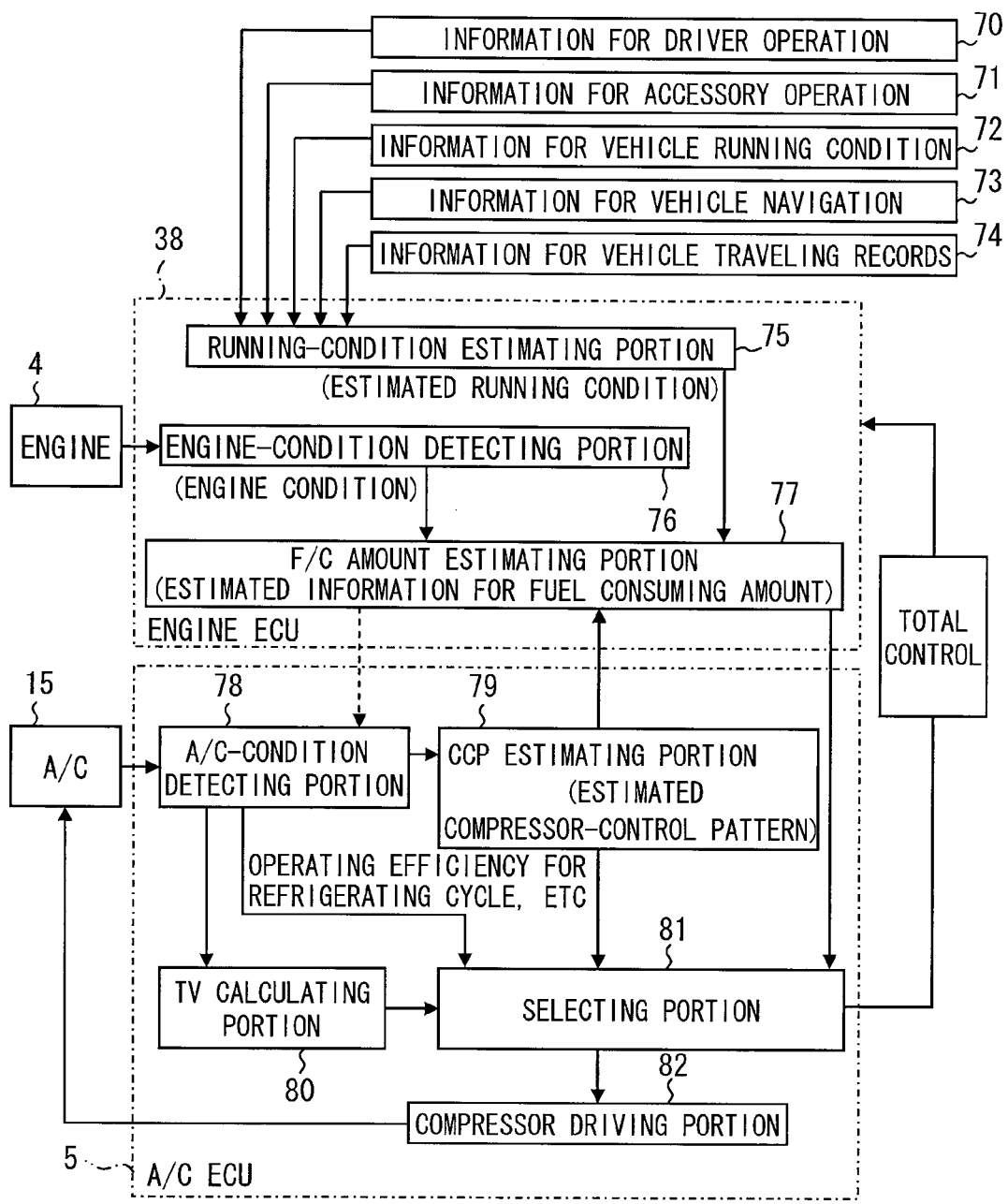
FIG. 3 is a block diagram showing the system structure of the first embodiment.

FIG. 3 is a block diagram showing the vehicle control system of the present embodiment. As shown in FIG. 3, the vehicle control system is composed of the engine ECU 38, the A/C ECU 5 and so on. The engine ECU 38 receives information 70 for driver operation, information 71 for accessory operation, information 72 for vehicle running condition, information 73 for vehicle navigation, information 74 for vehicle traveling record, and so on. The engine ECU 38 has a running-condition estimating portion 75, which estimates based on the above information a running condition relating to the engine rotational speed and engine torque at predetermined time points in the future (multiple estimation time points).

The information 70 for the driver operation includes, for example, information relating to operating amounts of the acceleration pedal, the brake pedal and so on. The information 71 for the accessory operation includes, for example, information indicating amplitude of output current from an alternator.

The information 72 for the vehicle running condition includes, for example, information of current vehicle speed. The information 73 for the vehicle navigation includes road information for a speed limit of a road, road information for traffic jams, road information for length of a sloping road, road information for inclination of the sloping road and so on. The information 74 for the vehicle traveling record corresponds to information for a vehicle future behavior, which includes, for example, probability for a predetermined future action of the vehicle. The information 74 shows the probability of a vehicle behavior of the vehicle heading to a working place (an office of the vehicle driver). More exactly, the information 74 indicates that the probability of the above vehicle behavior, according to which the vehicle is going to be parked in a parking space of the office located at 1,000 meter ahead of the current vehicle position, is 80%.

(Estimation for Future Running Condition)

The present embodiment will be further explained with reference to FIG. 3. As explained above, the running-condition estimating portion 75 estimates the running condition relating to the engine rotational speed and the engine torque at the predetermined future time points, base on the above information 70 to 74 (the information for estimating the future running condition). Estimated running condition includes parameters, such as, the vehicle speed, acceleration and deceleration, running load by the sloping road or snowy road, information for a shift position of the automatic transmission apparatus (also referred to as T/M information) and so on. Those parameters are closely related to fuel consumption ratio of the engine 4. Even when the vehicle speed and the acceleration/deceleration are the same, the torque of the engine 4 varies depending on the shift position of the automatic transmission apparatus. Therefore, the T/M information is important for estimating the future running condition.

(Calculation of Fuel Consuming Amount and Transmission to the A/C ECU)

The engine ECU 38 has an engine-condition detecting portion 76 for detecting an operating condition of the engine 4 (hereinafter, an engine condition). The engine ECU 38 further has a fuel-consuming-amount estimating portion 77 (hereinafter, a F/C amount estimating portion), which calculates (estimates) fuel consuming amount based on the estimated running condition and the engine condition, by way of characteristics for engine efficiency. The engine 4 will be operated with such fuel consuming amount so as to drive the compressor 1 in accordance with a selected pattern for controlling the operation of the compressor 1. Calculation result of the F/C amount estimating portion 77 (that is, the calculated fuel consuming amount) is transmitted to the A/C ECU 5, as indicated by a dotted line in FIG. 3. The calculated fuel consuming amount is also referred to as estimated information for the fuel consuming amount of the engine 4).

Figure 4:
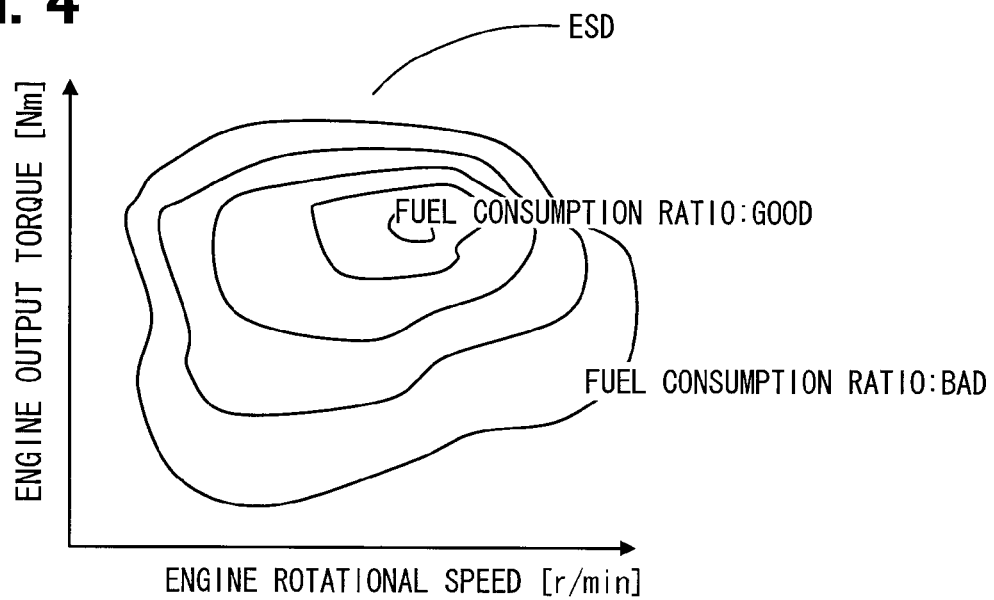
FIG. 4 is a graph showing one of characteristics for iso-fuel-consumption ratio of an engine, which is applied to the first embodiment.

The engine condition detected by the engine-condition detecting portion 76 includes, for example, information for temperature of the engine cooling water, so that a warming-up operation is carried out for the engine 4 when the temperature of the engine cooling water is low. The characteristics for the engine efficiency can be obtained from, for example, a map for characteristic curves of iso-fuel-consumption-ratio. FIG. 4 shows one of the characteristics for the iso-fuel-consumption-ratio curves for the engine 4 of the present embodiment. Data for the above characteristics are stored in the running-condition estimating portion 75. The characteristics of FIG. 4 correspond to characteristic data for the power source (which is also referred to as ESD) and show a relationship between motive energy of the power source (that is, the engine) and the fuel consuming amount.

FIG. 4 shows an example of the map for the fuel consumption ratio (the F/C ratio) with respect to parameters, that is, the output torque and the rotational speed of the engine 4. It is possible to figure out, based on FIG. 4, a change of the F/C ratio when the operational condition of the engine 4 is changed from one engine condition to another engine condition.

In FIG. 3, the A/C ECU 5 has a detecting portion 78 for detecting an operational condition of the A/C apparatus 15 (including, as the case may be, the information for the engine condition, such as the estimated information for fuel consuming amount of the engine 4). The operational condition of the A/C apparatus 15 is referred to as the A/C condition. The detecting portion 78 is referred to as the A/C-condition detecting portion 78. The detected A/C condition is sent to a compressor-control pattern estimating portion 79 (hereinafter, a CCP estimating portion 79) and a threshold-value calculating portion 80 (hereinafter, a TV calculating portion 80).

Figure 5:
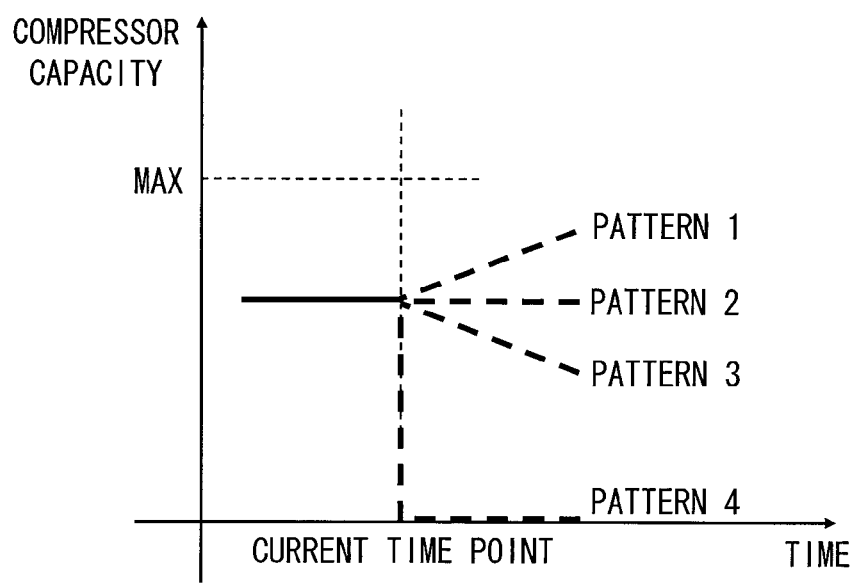
FIG. 5 is a graph showing estimated examples for control patterns of a compressor used in the first embodiment.

The CCP estimating portion 79 estimates several control patterns for controlling the compressor 1 based on the A/C condition. FIG. 5 shows an example for the control patterns for controlling the compressor (hereinafter, the compressor-control patterns). As shown in FIG. 5, four compressor-control patterns are estimated. One of the compressor-control patterns will be selected and the compressor 1 will be controlled in accordance with such selected compressor-control pattern for a predetermined future time period.

In FIG. 5, the pattern 1 shows such a compressor-control pattern, according to which the capacity of the compressor 1 (that is, work volume of the compressor 1) is increased to its maximum value. According to the pattern 2, a current capacity of the compressor 1 is maintained. According to the pattern 3, the capacity of the compressor 1 is decreased to its minimum value. According to the pattern 4, the capacity of the compressor 1 is made zero (the operation of the compressor is turned off). MAX in FIG. 5 indicates a maximum discharge amount of the compressor. The compressor is so controlled that its capacity does not exceed the value of MAX.

In FIG. 3, the estimated compressor-control patterns (the patterns 1 to 4) are transmitted to the F/C amount estimating portion 77 of the engine ECU 38. The F/C amount estimating portion 77 calculates the respective fuel consuming amounts (the estimated information for fuel consuming amount of the engine 4), which will be necessary for the engine 4 to drive the compressor 1 in accordance with each of the estimated compressor-control patterns.

The fuel consuming amounts, which are calculated by the F/C amount estimating portion 77 and which are respectively necessary for driving the compressor 1, are transmitted to a selecting portion 81 of the A/C ECU 5. The selecting portion 81 evaluates each of the compressor-control patterns and selects one of them.

Each fuel consuming amount transmitted to the selecting portion 81 corresponds to such fuel consuming amount necessary for driving the compressor 1 in accordance with selected compressor-control pattern and for cooling the passenger compartment by a desired amount for heat of cooling. The fuel consuming amount is expressed by a consuming amount of fuel for each unit of time or for each unit of torque.

The A/C-condition detecting portion 78 further calculates, based on the A/C condition, information for efficiency of the refrigerating cycle. The information for efficiency of the refrigerating cycle is transmitted to the selecting portion 81. The estimated compressor-control patterns are also transmitted from the CCP estimating portion 79 to the selecting portion 81. In addition, as explained below, threshold values for determination are transmitted from the TV calculating portion 80 to the selecting portion 81.

(Calculation of Threshold Values)

The TV calculating portion 80 of the A/C ECU 5 calculates the threshold values based on an amount of stored heat of cooling (a stored amount of cooling energy), past efficiency of cooling operation, the A/C condition (the outside-air temperature, the preset temperature, etc.) and so on. The threshold values relate to efficiency of cooling operation, when the A/C apparatus 15 is controlled in a conventional manner, namely when the A/C apparatus 15 is controlled without estimating the running condition of the vehicle. A unit or dimension of the threshold values is liter/calorie, which is also the unit or dimension for estimated heat cost (explained below).

Figure 6:
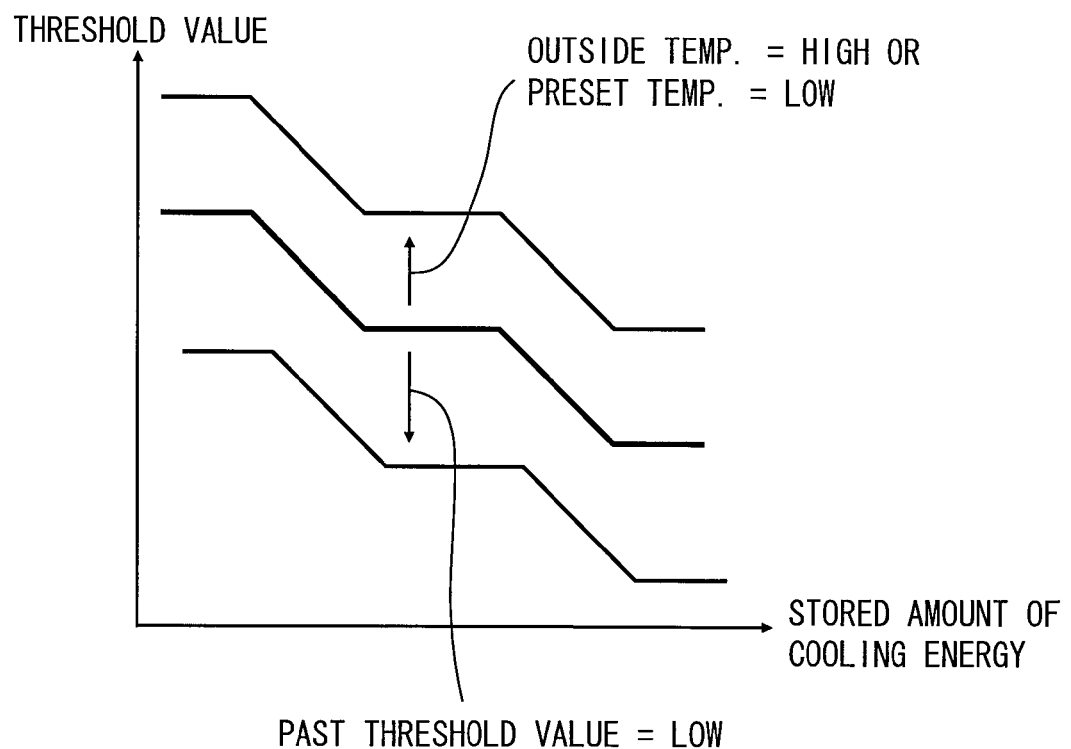
FIG. 6 is a graph showing characteristic curves used in the first embodiment for calculating threshold values.

FIG. 6 shows characteristic curves, which are used for calculating the threshold values in the present embodiment. As shown in FIG. 6, the threshold values become smaller, as the stored amount of the cooling energy becomes larger. The stored amount of the cooling energy is calculated by use of a map, based on an amount of the cold air having passed through the cool-storage device 40 and records of temperatures. The stored amount of the cooling energy may be calculated by any other methods known in the art.

Since the threshold values vary depending on the outside-air temperature, the preset temperature and so on, the threshold values are calculated at first and then such threshold values may be corrected depending on the outside-air temperature, the preset temperature and so on. In such a case, the threshold values are corrected to higher values, when the outside-air temperature is high or when the preset temperature is low.

The threshold values can be further corrected depending on the past threshold values. It is possible to learn the records for the past efficiency of the cooling operation of the A/C apparatus 15 and to preset the threshold values. According to such a case, the threshold values are decided depending on the past records. For example, the threshold values are preset at lower values, as the past records for the threshold values are lower. It is, therefore, possible to more properly decide the threshold values in accordance with the actual conditions.

The selecting portion 81 evaluates the respective compressor-control patterns, one of which will be selected in the predetermined future time period, based on;

(i) the threshold values from the TV calculating portion 80;

(ii) the information for efficiency of the refrigerating cycle from the A/C-condition detecting portion 78;

(iii) the compressor-control patterns from the CCP estimating portion 79; and (iv) the estimated fuel consuming amount of the engine 4 from the F/C amount estimating portion 77.

Then, the selecting portion 81 selects the most appropriate compressor-control pattern from the multiple alternatives (for the compressor-control patterns).

More exactly, the selecting portion 81 receives the estimated fuel consuming amount necessary for driving the compressor in accordance with the compressor-control patterns from the F/C amount estimating portion 77. Then, the selecting portion 81 estimates an amount for heat of cooling (a heat absorbing amount), which will be generated by the operation of the compressor when it is operated in accordance with each compressor-control pattern, based on the target air-blowing temperature TAO of the A/C apparatus 15 and the information for efficiency of the refrigerating cycle. The above amount for the heat of cooling (which will be generated by the compressor operation) is also referred to as "heat-of-cooling amount to be generated".

In addition, the selecting portion 81 calculates efficiency for the cooling operation, based on the following formula 2. The efficiency for the cooling operation (that is, 1/the estimated heat cost) is expressed by a ratio of the heat-of-cooling amount to be generated with respect to the fuel consuming amount for driving the compressor 1.

The efficiency for the cooling operation=1/the estimated heat cost=(the heat-of-cooling amount to be generated)/(the estimated fuel consuming amount for driving the compressor)   (Formula 2)

(Calculation of Valuation Values)

The selecting portion 81 further calculates evaluation values by use of the threshold values calculated and decided by the TV calculating portion 80. The evaluation values are calculated in accordance with the following formula 3 for the respective compressor-control patterns. According to the formula 3, the evaluation values are obtained by subtracting the estimated heat cost from the threshold value and then such a subtracted value is multiplied by the heat-of-cooling amount to be generated.

The evaluation value=Σ(the threshold value−the estimated heat cost)×the heat-of-cooling amount to be generated   (Formula 3)

In the above formula 3, the dimension or the unit for the threshold value and the estimated heat cost is liter/calorie. A dimension for the heat-of-cooling amount to be generated is calorie. Accordingly, a dimension for the evaluation value becomes liter. Namely, the evaluation value (in the dimension of liter) shows the fuel consuming amount (liter), which can be saved in comparison with the conventional control manner, when the A/C apparatus 15 is operated in accordance with the respective compressor-control patterns. The calculation for the evaluation values by use of the evaluation formula (the formula 3) is carried out for the respective compressor-control patterns, for the predetermined future time period, and for predetermined time intervals.

(Selection of Compressor-Control Pattern)

After the above evaluation values are calculated for the respective compressor-control patterns, such compressor-control pattern, according to which the fuel-consuming amount can be mostly saved, is selected.

(Control of Work Volume for the Compressor)

A control signal is supplied to the compressor 1 of the A/C apparatus 15 from a compressor driving portion 82 of the A/C ECU 5 in accordance with the selected compressor-control pattern.

Figure 7A:
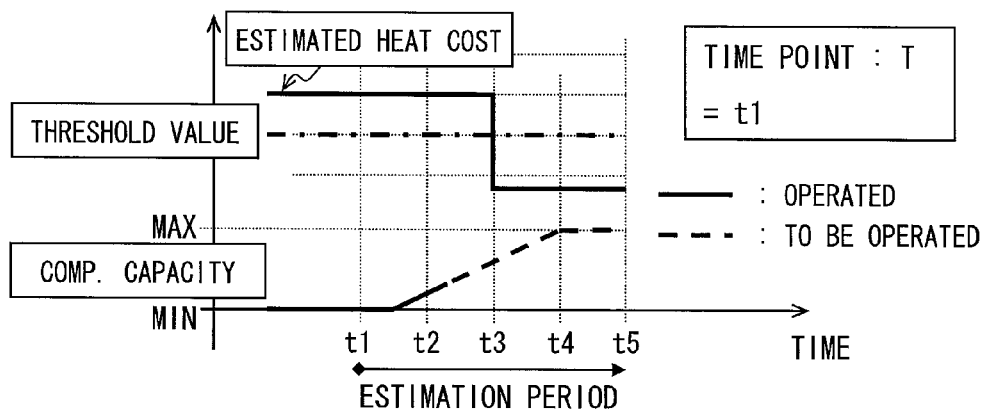
FIGS. 7A to 7C are time-charts respectively showing operating patterns of the compressor according to the first embodiment.
Figure 7B:
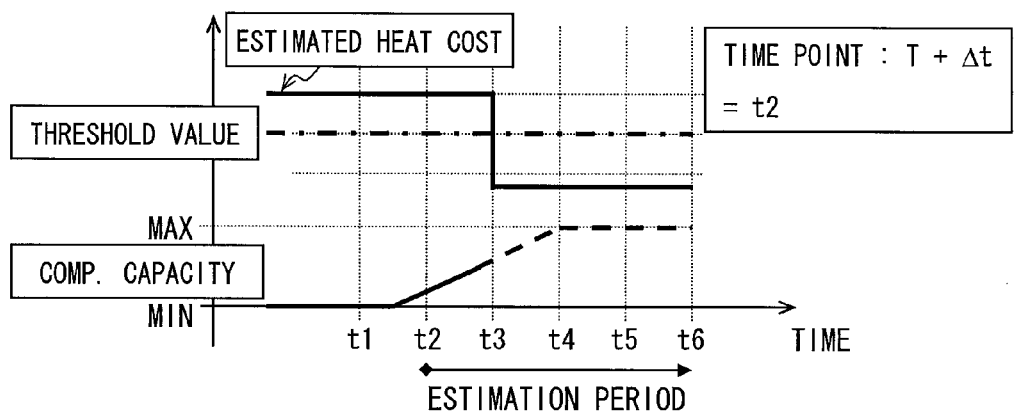
Figure 7C:
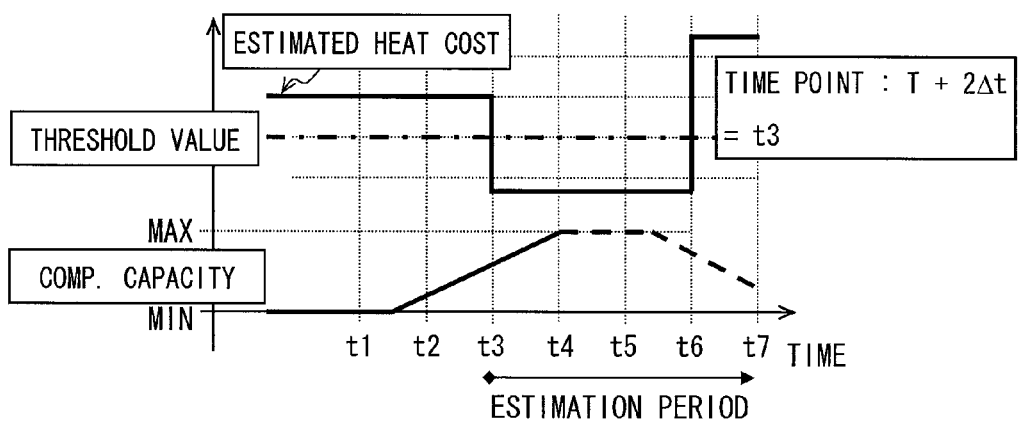

FIGS. 7A to 7C are graphs for characteristic lines showing control results, when the compressor is operated in accordance with the selected compressor-control pattern. In case of the example of FIGS. 7A to 7C, the capacity of the compressor is changed as a parameter for the compressor-control pattern, wherein the capacity of the compressor is increased. The estimated heat cost is not decreased in a right-angle shape but gradually decreased in actual cases. However, in FIGS. 7A to 7C, the estimated heat cost are indicated as being decreased in the right-angle shape, for the purpose of simplicity.

As shown in FIGS. 7A to 7C, at each time point T, T+Δt and T+2Δt, the evaluation value is calculated for each of the compressor-control patterns by use of the evaluation formula (the formula 3) for a predetermined future time period (an estimation period) to an estimation end point. Such a compressor-control pattern, according to which the evaluation value becomes maximum, is selected, so that the compressor is operated in accordance with such selected compressor-control pattern for an operational time period of "Δt" following the respective time points.

At the time point T (more exactly, in an operational time period from t1 to t2), as shown in FIG. 7A, the capacity of the compressor is increased before the estimated heat cost becomes lower than the threshold value. At the time point T+Δt, as shown in FIG. 7B, the compressor-control pattern, which has been selected at the previous time point T, is maintained for an operational time period from t2 to t3. The capacity of the compressor 1 will be restricted, so that the capacity of the compressor 1 does not exceed the maximum discharging amount (MAX).

At the time point T+2Δt, as shown in FIG. 7C, such a compressor-control pattern is selected, according to which the evaluation value becomes higher than the evaluation value of the compressor-control pattern selected at the previous time point T+Δt, so that the evaluation value of the evaluation formula (the formula 3) becomes a maximum value. According to such selected compressor-control pattern, the capacity of the compressor will be decreased in an operational time period from t5 to t6 before the estimated heat cost becomes higher than the threshold value.

Figure 8:
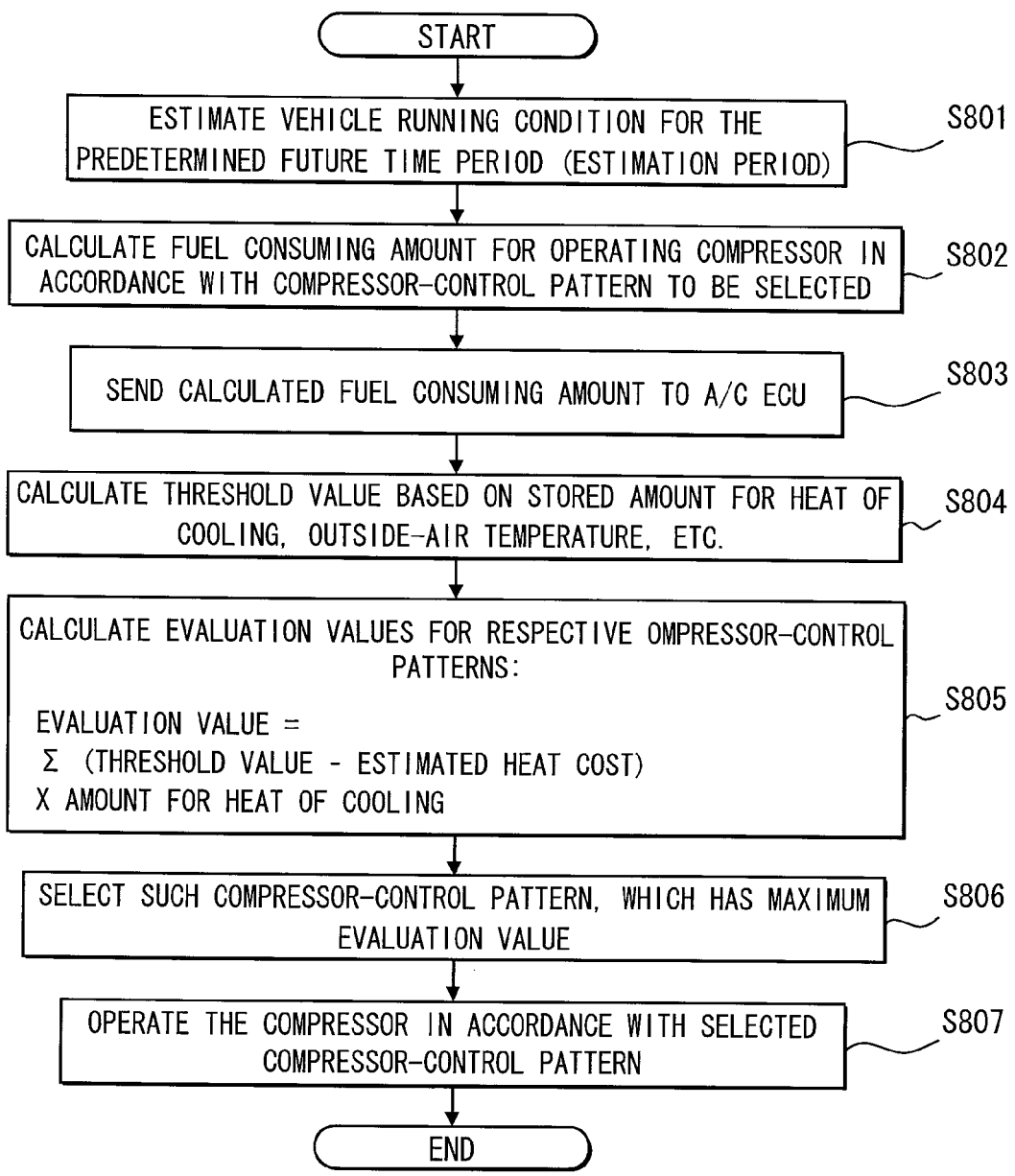
FIG. 8 is a flow-chart showing a process for controlling the vehicle control system of the first embodiment.

FIG. 8 shows a flowchart, according to which the compressor 1 is operated. At a step S801, the engine ECU 38 estimates the vehicle running condition as well as the engine condition relating to the engine rotational speed and the engine torque for the predetermined future time period.

At a step S802, the engine ECU 38 calculates the fuel consuming amount by use of the characteristics for engine efficiency based on the estimated running condition and the estimated engine condition, wherein the fuel consuming amount is necessary for operating the compressor 1 in accordance with the selected compressor-control pattern so as to store the heat of cooling (the cooling energy) in the cool-storage device 40.

At a step S803, the fuel consuming amount (which is calculated by the engine ECU 38 and which is necessary for operating the compressor 1 in accordance with the selected compressor-control pattern) is sent to the A/C ECU 5.

At a step S804, the A/C ECU 5 (more exactly, the TV calculating portion 80) calculates the threshold values based on the stored amount for the heat of cooling, the past efficiency of the cooling operation, the A/C condition (the outside-air temperature, the preset temperature, etc.) and so on.

At a step S805, the A/C ECU 5 calculates the estimated heat cost. In Addition, the A/C ECU 5 (the selecting portion 81) calculates the evaluation values by use of the evaluation formula (the formula 3) based on the threshold values. As already explained above, the evaluation values are calculated for the respective compressor-control patterns. According to the evaluation formula (the formula 3), each of the evaluation values is obtained by subtracting the estimated heat cost from the threshold value and then such subtracted value is multiplied by the amount for the heat of cooling (that is, the heat-of-cooling amount to be generated).

At a step S806, the A/C ECU 5 (the selecting portion 81) selects such compressor-control pattern, according to which the evaluation value becomes maximum, namely according to which the fuel consuming amount can be saved at a maximum level.

At a step S807, the A/C ECU 5 (the compressor driving portion 82) sends the control signal to the compressor 1 in accordance with the selected compressor-control pattern so as to drive the compressor 1 accordingly.

Advantages of the First Embodiment

Advantages of the first embodiment will be explained. In the first embodiment, it is possible to calculate the estimated heat cost based on the estimated engine condition (for example, the engine rotational speed, the engine torque, etc.). The estimated heat cost is related to the efficiency of the cooling operation (hereinafter, the cooling efficiency), when the compressor 1 is operated in accordance with a certain compressor-control pattern (for example, rotational speed is gradually increased or gradually decreased). Based on the estimated heat cost related to the cooling efficiency, it is possible to select the compressor-control pattern, which is most appropriate in view of reducing the fuel consuming amount. According to the present embodiment, optimization for saving the fuel consuming amount is possible not only in a period shortly before the vehicle decelerating operation but also in a longer period. In other words, in the whole operating period of the A/C apparatus 15, the appropriate compressor-control pattern (which is most effective for reducing the fuel consuming amount) is selected and the compressor is operated in accordance with such compressor-control pattern. Accordingly, the effectiveness for reducing the fuel consuming amount (that is, the effectiveness for improving fuel consumption ratio) becomes larger.

In the present embodiment, it is possible to cool down the passenger compartment of the vehicle by use of the stored energy for the heat of cooling in the heat exchanges 9 and 40 (including the heat of cooling stored in the refrigerating cycle). As the amount of the stored energy for the heat of cooling is larger, the cooling operation can be done with a higher cooling efficiency. The work volume of the compressor 1 can be reduced when the stored amount for the heat of cooling becomes larger.

It is possible to select the most appropriate compressor-control pattern for reducing the fuel consuming amount from the multiple compressor-control patterns, based on the estimated heat cost related to the cooling efficiency and the threshold value related to the stored amount for the heat of cooling (that is, the stored amount of the cooling energy).

The compressor-control pattern is selected based on a magnitude relation between the estimated heat cost (related to the cooling efficiency) and the threshold value by calculating a difference between them ("the threshold value"–"the estimated heat cost"). For example, when the A/C ECU 5 estimates that the estimated heat cost will become smaller than the threshold value in the predetermined future time period (in the estimation period), the A/C ECU 5 selects the compressor-control pattern according to which the work volume of the compressor will be increased in the predetermined operational period (for example, in the period from t1 to t3 in FIGS. 7A and 7B). According to the above operation, since the output of the compressor is positively utilized when the refrigerating cycle is operated at a high efficiency (namely, when the cooling efficiency is high), it is possible to realize the A/C operation having a large effect for reducing the fuel consuming amount.

The compressor-control pattern is selected based on a difference between the value related to the cooling efficiency and the threshold value. For example, when the A/C ECU 5 estimates that the difference between the value related to the cooling efficiency and the threshold value becomes larger, the A/C ECU 5 selects the compressor-control pattern, according to which the work volume of the compressor will be increased in the predetermined operational period. As a result, it is possible to positively utilize the output of the compressor when the refrigerating cycle is operated at the high efficiency.

In the present embodiment, it is possible to calculate, based on the estimated engine condition (the engine rotational speed, the engine torque or the like), the fuel consuming amount (the unit therefor is, for example, liter) necessary for driving the compressor 1 in accordance with the selected compressor-control pattern as well as the amount of the heat of cooling (the unit therefor is, for example, calorie) to be generated by the cooling operation with such fuel consuming amount.

A ratio of the fuel consuming amount with respect to the amount of the heat of cooling (to be generated by the cooling operation with such fuel consuming amount) is defined as the estimated heat cost (the dimension thereof is, for example, liter/calorie). Therefore, the estimated heat cost corresponds to the value related to the cooling operation of the A/C apparatus. It is possible to select, based on the estimated heat cost, the most appropriate compressor-control pattern having the high effect for reducing the fuel consuming amount.

The threshold value is decreased as the stored amount for the heat of cooling (the stored amount of the cooling energy) is increased. The threshold value has the same dimension (the same unit) to that of the estimated heat cost. Therefore, the selecting portion 81 of the A/C ECU 5 can simply compare the estimated heat cost with the threshold value so as to select the most appropriate compressor-control pattern. According to the present embodiment, the selecting portion 81 compares the estimated heat cost (the unit thereof is "liter/calorie"), which is an inverse number of the cooling efficiency, with the threshold value (the unit thereof is "liter/calorie"), which is decreased depending on the increase of the stored amount for the heat of cooling. When the A/C ECU 5 estimates based on the above comparison that the estimated heat cost will become smaller than the threshold value (namely, the cooling efficiency will be increased), the compressor 1 is so controlled as to increase its discharge amount for the predetermined operational period. In other words, the work volume of the compressor 1 is increased for the predetermined operational period, as shown in FIGS. 7A and 7B.

The threshold value is such a value (the unit thereof is "liter/calorie"), which is calculated based on the stored amount for the heat of cooling as well as the value representing the vehicle circumstances influencing on the A/C condition of the vehicle. Since the threshold value varies depending on not only the stored amount for the heat of cooling but also the preset temperature, the outside-air temperature or the like (the values representing the vehicle circumstances influencing on the A/C condition of the vehicle), it is possible to more exactly decide the threshold value. It is, therefore, possible to more properly select the compressor-control pattern. For example, the threshold value may be increased as the outside-air temperature becomes higher, so that the work volume of the compressor 1 is increased. The threshold value is also referred to as "a required heat cost".

In addition, since the threshold value is calculated based on the preset temperature and/or the outside-air temperature, the threshold value can be set at a higher value, so as to increase the discharging amount of the compressor 1. For example, it is possible to set the threshold value at such a higher value that the work volume of the compressor becomes larger as the outside-air temperature is higher and the preset temperature is lower.

As shown in FIG. 6, the threshold value is further set depending on the past records. For example, the threshold value is made smaller as the past threshold value was smaller. Since it is possible to set the threshold value as the value more exactly reflecting the actual situation, the fuel consuming amount can be more effectively reduced. In addition, since it is possible to correctly set the threshold value even when the operational condition of the vehicle or a place of destination for the vehicle is different from vehicle to vehicle, the fuel consumption ratio can be surely improved.

According to the present embodiment, the A/C apparatus 15 has the cool-storage device 40 at such a position close to the heat exchanger 9 (including a case in which the cool-storage device 40 is integrally formed with the evaporator 9). The passenger compartment of the vehicle is cooled by the cold air having passed through the cool-storage device 40, wherein the air is cooled by the stored heat of cooling or directly cooled by the vaporization of the refrigerant. In the present embodiment, the threshold value is set based on the stored amount for the heat of cooling.

Since the cool-storage device 40 having the cool-storage material is provided in the A/C apparatus 15, the amount of the heat of cooling which can be stored in the heat-exchanger 9 and/or the refrigerating circuit can be increased to a large extent. In other words, the A/C operating period in which the cooling operation can be possible without operating the compressor 1 can be increased. Therefore, when the threshold value is decided by taking the stored amount for the heat of cooling into consideration, it becomes possible to more properly control the operation of the compressor.

In the present embodiment, since it is possible to store the heat of cooling in the cool-storage device 40 by increasing the work volume of the compressor 1 when the cooling efficiency of the A/C apparatus is high (when the estimated heat cost, that is, the value related to the cooling efficiency becomes smaller than the threshold value), as shown in FIG. 7A, it is possible to operate the compressor in accordance with the most appropriate compressor-control pattern so as to improve the fuel consumption ratio.

In addition, in the present embodiment, the evaluation values are calculated by use of the evaluation formula (the formula 3) for the respective compressor-control patterns, wherein each of the evaluation values represents the fuel consuming amount to be saved. According to the evaluation formula, the estimated heat cost (that is, the value related to the cooling efficiency) is subtracted from the threshold value, and such subtracted value is multiplied by the amount for the heat of cooling to obtain the evaluation value. Then, the compressor-control pattern, which has the maximum evaluation value, is selected.

In the evaluation formula (the formula 3), since the unit for the threshold value is "liter/calorie", the unit for the estimated heat cost (that is, the value related to the cooling efficiency) is also "liter/calorie", and the unit for the amount for the heat of cooling is "calorie", the unit (the dimension) for the evaluation value becomes "liter". The evaluation value can be thus calculated by use of the simple formula. The fuel consuming amount can be represented by the simply-calculated evaluation value, wherein the fuel consuming amount corresponds to the value which can be saved by the operational control of the compressor according to the present embodiment when compared with the conventional operational manner and which can be calculated by the comparison between the estimated heat cost (the value related to the cooling efficiency) and the threshold value.

According to the present embodiment, therefore, it is possible to effectively operate the compressor in the operational condition of the refrigerating cycle, which is operated with high efficiency. Namely, the compressor can be operated with such control pattern, which can effectively reduce the fuel consuming amount. In addition, since a computing amount is not large, the cost for the A/C ECU 5 can be reduced. In a case that all of the evaluation values (showing the fuel consuming amount which can be saved) become negative figures, the compressor is not operated.

In the present embodiment, as shown in FIG. 3, the selected compressor-control pattern is transmitted, for example, via CAN (the communication network provided in the vehicle), from the A/C ECU 5 to the engine ECU 38 so as to carry out the total control for the vehicle. For example, the torque for the compressor 1 and the engine torque are totally controlled. According to such a total control, the engine 4 outputs the engine torque by taking the torque for the compressor into consideration. As a result, even when the work volume for the compressor 1 is largely changed for the predetermined operational period, the engine torque is correspondingly changed so as to improve drivability of the vehicle.

The first embodiment further has the following structure and operation, when the first embodiment is observed from a different view point. In a vehicle control system, in which an accessory device (for example, the compressor 1) is driven by a power source (a driving source, such as the engine 4), a control unit (the A/C ECU 5, the engine ECU 38) estimates a vehicle running condition for a predetermined estimation period. The vehicle running condition will influence on an operation of the accessory device 1 in such predetermined estimation period. The control unit (an estimating section corresponding to the step S801) estimates a driving-source condition related to operation efficiency of the accessory device 1, based on the estimated driving-source condition at the predetermined future time points (or for the predetermined estimation period). The control unit (a calculation section corresponding to the step S805) further calculates such a value related to the operation efficiency of the accessory device 1 based on the estimated driving-source condition (estimated by the estimating section corresponding to the step S801), when the accessory device 1 is operated in accordance with respective operating patterns. The control unit (a selecting section corresponding to the step S806) selects the most appropriate operating pattern from the multiple operating patterns, based on the value related to the operation efficiency. The control unit (a driving section corresponding to the step S807) drives the accessory device 1 in accordance with the selected operating pattern.

According to the above structure and operation, it is possible to calculate the value related to the operation efficiency based on the estimated driving-source condition, for respective cases in which the accessory device is operated in accordance with each of the operating patterns. It is possible to select the most appropriate operating pattern having the highest effect for reducing the fuel consuming amount, based on the calculated value related to the operation efficiency. The most appropriate operating pattern is selected and the accessory device is operated in accordance with such selected operating pattern. The optimization for reducing the fuel consuming amount is possible not only for the period shortly before the vehicle decelerating operation but also for the longer period. Namely, since the accessory device is operated in accordance with the appropriate operating pattern in the whole operating period of the accessory device, the effectiveness for reducing the fuel consuming amount becomes larger.

In the above structure and operation, the accessory device 1 corresponds to the compressor 1 for the A/C apparatus 15 for air-conditioning the passenger compartment of the vehicle. The compressor 1 compresses the refrigerant circulating in the refrigerating cycle, so that the refrigerant flows into the evaporator 9. The compressor 1 of the A/C apparatus 15 is operated by the driving source 4, so that the passenger compartment is cooled by the heat of cooling generated in the refrigerating cycle. A part of the heat of cooling is stored in the A/C apparatus 15 and the heat of cooling is radiated during the period in which the compressor operation is stopped, so as to continuously cool the passenger compartment of the vehicle. The estimating section (corresponding to the step S801) estimates the vehicle running condition, which gives influence on the condition of the driving source, for the predetermined estimation period. The estimating section (corresponding to the step S801) estimates the driving-source condition related to the cooling efficiency of the A/C apparatus 15 based on the estimated vehicle running condition at the predetermined future time points (or for the predetermined estimation period). The calculating section (corresponding to the step S805) calculates the values related to the cooling efficiency of the A/C apparatus 15 based on the estimated driving-source condition (estimated by the estimating section corresponding to the step S801) for the respective cases in which the compressor is operated in accordance with each of the compressor-control patterns. The selecting section (corresponding to the step S806) selects the most appropriate compressor-control pattern from the multiple compressor-control patterns based on the values related to the cooling efficiency. And the driving section (corresponding to the step S807) drives the compressor in accordance with the selected compressor-control pattern.

According to the above structure and operation, it is possible to calculate, based on the estimated driving-source condition, the values related to the cooling efficiency for the respective cases in which the compressor is operated in accordance with each of the compressor-control patterns. It is, then, possible to select, based on the value related to the cooling efficiency, the most appropriate compressor-control pattern having the highest effectiveness for reducing the fuel consuming amount. As above, the most appropriate compressor-control pattern is selected and the A/C apparatus is operated in accordance with such selected compressor-control pattern. The optimization for reducing the fuel consuming amount is possible not only for the period shortly before the vehicle decelerating operation but also for the longer period. Namely, since the A/C apparatus is operated in accordance with the appropriate compressor-control pattern in the whole operating period of the A/C apparatus, the effectiveness for reducing the fuel consuming amount becomes much larger.

The selecting section (corresponding to the step S806) selects the most appropriate compressor-control pattern from the multiple compressor-control patterns, based on the threshold value related to the cooling efficiency (which corresponds to a required level of the A/C apparatus at the predetermined future time point) as well as the value related to the cooling efficiency at the predetermined future time point.

According to the above structure and operation, it is possible to calculate, based on the estimated driving-source condition, the values related to the cooling efficiency for the respective cases in which the compressor is operated in accordance with each of the compressor-control patterns. It is possible to select the most appropriate compressor-control pattern having the highest effectiveness for reducing the fuel consuming amount from the multiple compressor-control patterns, based on the values related to the cooling efficiency as well as the threshold value at the predetermined time point.

In addition, the A/C apparatus 15 has the cool-storage device 40 at such a position close to the heat-exchanger 9 or in the refrigerating cycle, so that the air passing through the cool-storage device 40 is cooled by the stored heat of cooling or directly cooled by the vaporization of the refrigerant. The passenger compartment is air-conditioned by such cold air, even when the compressor is not operated.

Since the cool-storage device having the cool-storage material is provided in the A/C apparatus, the amount of the heat of cooling which can be stored in the heat-exchanger and/or the refrigerating circuit can be increased to a large extent. In other words, the A/C operating period in which the cooling operation can be possible without operating the compressor can be increased. Therefore, it becomes possible to more properly control the operation of the compressor so as to reduce the fuel consuming amount.

In the above structure and operation, the work volume of the compressor 1 is increased, when the value related to the cooling efficiency is compared with the threshold value for the stored amount for the heat of cooling in the cool-storage device and when the cooling efficiency of the A/C apparatus 15 is high. According to such operation, it is possible to increase the amount for the heat of cooling, which will be stored in the cool-storage device and/or in the refrigerating cycle. The A/C operating period without using the compressor can be prolonged. Since the work volume of the compressor is increased in order to store the heat of cooling in the cool-storage device when the cooling efficiency of the A/C apparatus is high (as a result of the comparison between the value related to the cooling efficiency and the threshold value), it becomes possible to more properly control the operation of the compressor.

The value related to the cooling efficiency corresponds to the estimated heat cost, which is defined by the ratio of the fuel consuming amount (which is necessary for driving the compressor in accordance with the compressor-control pattern) with respect to the amount for the heat of cooling (which is generated by the cooling operation with such fuel consuming amount). The above fuel consuming amount as well as the amount for the heat of cooling is calculated based on the estimated driving-source condition estimated by the estimating section (corresponding to the step S801).

As above, it is possible to calculate, based on the estimated driving-source condition, not only the fuel consuming amount necessary for driving the compressor in accordance with the compressor-control patterns but also the amount for the heat of cooling generated by such fuel consuming amount. The estimated heat cost, which is the ratio of the fuel consuming amount with respect to the amount for the heat of cooling, corresponds to the value related to the cooling efficiency (which represents the cooling efficiency). The most appropriate compressor-control pattern (having the highest effectiveness for reducing the fuel consuming amount) is selected based on the estimated heat cost.

The threshold value becomes smaller as the stored amount of the cooling energy (which is the amount for the heat of cooling stored in the A/C apparatus 15 including the cool-storage device) is increased. The threshold value has the same dimension to that of the estimated heat cost. The selecting section (corresponding to the step S806) selects the most appropriate compressor-control pattern through the comparison between the estimated heat cost and the threshold value.

When the control unit estimates that the cooling efficiency is increased, based on the comparison between the estimated heat cost and the threshold value, the compressor is so controlled to increase its discharging amount for the predetermined operational period (in the estimation period). The work volume of the compressor is thus increased.

The compressor-control pattern is selected based on the magnitude relation between the estimated heat cost (related to the cooling efficiency) and the threshold value. When the cooling efficiency is estimated to be increased, such compressor-control pattern is selected so that the work volume of the compressor is increased for the predetermined operational period (in the estimation period). According to such operation, since the output of the compressor is positively utilized when the refrigerating cycle is operated at the high efficiency, it is possible to realize the A/C operation having the high effect for reducing the fuel consuming amount.

The threshold value is calculated based on the stored amount for the heat of cooling as well as the value representing the vehicle circumstances influencing on the A/C condition of the vehicle at the estimation end point. Since the threshold value varies depending on not only the stored amount for the heat of cooling but also the preset temperature, the outside-air temperature or the like (the values representing the vehicle circumstances influencing on the A/C condition of the vehicle), it is possible to more exactly decide the threshold value. In other words, it is possible to more properly select the compressor-control pattern.

The values representing the vehicle circumstances include the preset temperature, the outside-air temperature or the like. Since the threshold value is calculated based on the preset temperature and/or the outside-air temperature, the threshold value can be set at the higher value, so as to increase the discharging amount of the compressor. For example, it is possible to set the threshold value at such higher value so that the work volume of the compressor becomes larger as the outside-air temperature is higher and the preset temperature is lower.

The A/C ECU learns the past records for the threshold values so as to set the threshold values in the subsequent processes. For example, the threshold value is made smaller as the past threshold value was smaller. Since it is possible to set the threshold value as the value more exactly reflecting the actual situation, the fuel consuming amount can be more effectively reduced. In addition, since it is possible to correctly set the threshold value even when the operational condition of the vehicle or the place of destination for the vehicle is different from vehicle to vehicle, the fuel consumption ratio can be surely improved.

The A/C ECU calculates the fuel consuming amounts which can be saved for the respective compressor-control patterns, based on the threshold value, the value related to the cooling efficiency and the amount for the heat of cooling for air-conditioning the air in the passenger compartment at the desired temperature. Then, the A/C ECU selects the compressor-control pattern which has the maximum fuel consuming amount to be saved.

According to the above operation, it is possible to calculate the fuel consuming amount which can be saved, by taking into consideration the value related to the estimated cooling efficiency and the threshold value. Since the output of the compressor is positively utilized by use of such fuel consuming amount when the refrigerating cycle is operated at the high efficiency, it is possible to realize the A/C operation having the high effectiveness for reducing the fuel consuming amount.

The A/C ECU 5 for controlling the A/C apparatus 15 transmits the selected compressor-control pattern to the engine ECU 38 for controlling the driving source 4, so as to totally control the torque for the compressor 1 and the torque for the driving source 4.

According to the above total control, the driving source 4 outputs the torque for the driving source by taking the torque for the compressor into consideration. As a result, even when the work volume for the compressor 1 is largely changed for the predetermined operational period, the torque for the driving source is correspondingly changed so as to improve drivability of the vehicle.

The first embodiment can be modified in various manners. In one of modifications, the selecting section (corresponding to the step S806) selects the most appropriate compressor-control pattern from the multiple compressor-control patterns, based on a value related to deviation between the preset temperature and the air-blowing temperature at the estimation endpoint as well as the value related to the cooling efficiency.

According to the above operation, it is possible to select the most appropriate compressor-control pattern having the high effectiveness for reducing the fuel consuming amount, among the multiple compressor-control patterns, based on the value related to the cooling efficiency as well as the value related to the deviation between the preset temperature and the air-blowing temperature. As above, the A/C apparatus is operated with the compressor-control pattern having the high effectiveness for reducing the fuel consuming amount not only for the period shortly before the vehicle decelerating operation but also for the almost whole period for the A/C operation. The effect for reducing the fuel consuming amount becomes much larger.

In another modification of the first embodiment, the A/C ECU calculates the following items based on the estimated driving-source condition (which is estimated by the estimating section corresponding to the step S801);

(i) the estimated heat cost, which represents the fuel consuming amount of the A/C apparatus with respect to the amount for the heat of cooling, for the case in which the compressor is operated in accordance with the compressor-control pattern in order to generate the heat of cooling and to cool the air in the passenger compartment;

(ii) the preset temperature of the A/C apparatus;

(iii) the air-blowing temperature of the A/C apparatus, that is, the temperature of the air-conditioned air blowing into the passenger compartment;

(iv) the amount for the heat of cooling; and (v) a correction coefficient.

The A/C ECU figures out a sum of the following values (a) and (b) by use of the above items (i) to (v) for the respective compressor-control patterns:

(a) a value corresponding to an inverse number of the estimated heat cost; and (b) a value of deviation between the preset temperature and the air-blowing temperature, wherein the deviation is multiplied by the correction coefficient and the amount for the heat of cooling.

The A/C ECU selects the compressor-control pattern, which has the maximum value for the above sum.

According to the above modification, it is possible to select the compressor-control pattern having the largest value for the inverse number (1/the estimated heat cost), which corresponds to the value related to the cooling efficiency.

In the above evaluation values, it is supposed that the air-blowing temperature becomes lower than the preset temperature. When a difference between the above temperatures (the difference=the preset temperature−the air-blowing temperature) becomes larger, the required degree for the cooling operation is large, for example, in a case of a "cool-down" operating mode. In such a case, the compressor-control pattern is selected, according to which the amount for the heat of cooling to be generated is larger. Accordingly, it is possible to select the compressor-control pattern for effectively utilizing the driving force for the compressor in the circumstances that the refrigerating cycle is operating at the high efficiency. As a result, it is possible to properly respond to the situation in which the required degree of the cooling operation is high. In addition, a high cost performance can be obtained, because the computing load is not large.

Second Embodiment

A second embodiment of the present disclosure will be explained.

Figure 9:
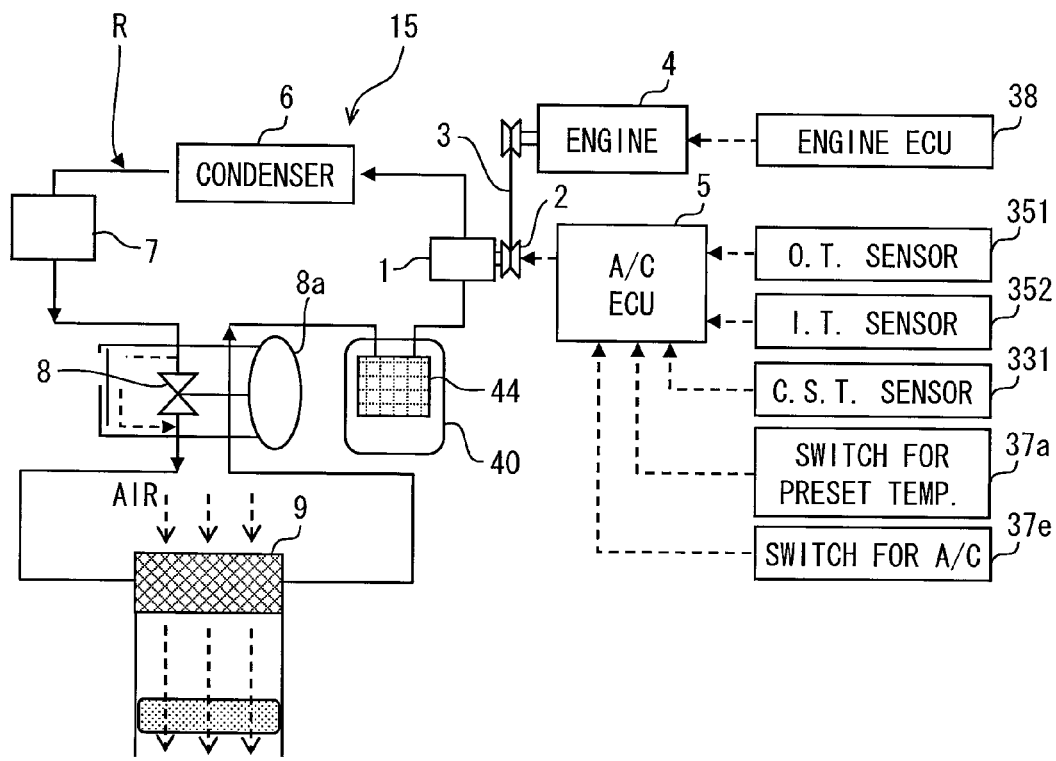
FIG. 9 is a schematic view showing a system structure for a vehicle control system according to a second embodiment of the present disclosure.

In the first embodiment, the cool-storage device 40 is cooled down by the cold air passing through the evaporator 9. However, the cool-storage device 40 may be provided in the refrigerating cycle, for example, as disclosed in Japanese Patent Publication No. 2009-12721. FIG. 9 is a system structure showing the A/C apparatus 15 for the vehicle according to the second embodiment.

In FIG. 9, the refrigerating cycle R is composed of the compressor 1, the condenser 6, the receiver 7, the expansion valve 8, the heat-exchanger 9 provided in the passenger compartment (that is, the evaporator 9) and the cool-storage device 40, which are connected in series to each other by refrigerant pipes (indicated by lines) to form the closed circuit. The refrigerant flows in the closed circuit.

As shown in FIG. 9, the cool-storage device 40 having the cool-storage material 44 is provided in the refrigerant cycle R, through which the refrigerant is circulated. The refrigerant flows through the evaporator 9 so as to cool the air passing through the evaporator 9 and blowing into the passenger compartment. The threshold value is set based on the stored amount for the heat of cooling in the cool-storage device 40.

The cool-storage material 44 is provided in the cool-storage device 40. The refrigerant from the evaporator 9 flows into the cool-storage device 40 to cool down the cool-storage material 44, to thereby store the heat of cooling in the cool-storage device 40. The temperature of the refrigerant is increased through the heat-exchange between the cool-storage material 44 in the cool-storage device 40, and the refrigerant flows back into the compressor 1.

In FIG. 9, the numeral 38 designates the engine ECU 38, a numeral 351 designates a temperature sensor for detecting temperature of the outside air, a numeral 352 designates a temperature sensor for detecting temperature of the inside air, and a numeral 331 designates a temperature sensor for detecting temperature of the cool-storage material 44 of the cool-storage device 40. In addition, the numeral 37a designates the switch for setting the preset temperature for the A/C operation, and the numeral 37e designates the switch for the A/C apparatus 15.

Third Embodiment

A third embodiment of the present disclosure will be explained. In the first embodiment, the four compressor-control patterns are provided (FIG. 5) in view of not increasing the computing load for the A/C ECU. However, the number of the compressor-control patterns can be increased when high-speed processing is possible in the A/C ECU.

Figure 10:
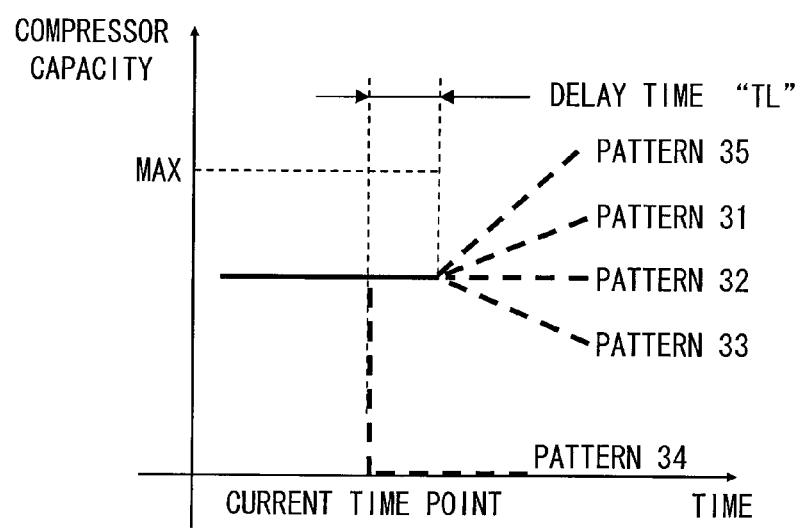
FIG. 10 is a graph showing estimated examples for control patterns of a compressor used in a third embodiment of the present disclosure.

FIG. 10 is a graph showing compressor-control patterns according to the third embodiment. As shown in FIG. 10, a delay time "TL" is provided for carrying out the compressor-control patterns 31 to 33 and 35. The delay time "TL" can be changed depending on the rotational speed of the compressor 1 (that is, the rotational speed of the engine 4). As shown in FIG. 10, the compressor-control pattern 35 is provided, wherein the pattern 35 has a sharp inclination for increasing the discharging amount of the compressor 1. The pattern 34 shows that the operation of the compressor 1 is stopped.

Fourth Embodiment

A fourth embodiment of the present disclosure will be explained.

A rate of change for the work volume (hereinafter, a work-volume change-rate "P") is set as such a value, which has an influence on the drivability of the vehicle or the life-time of the A/C apparatus 15. The work-volume change-rate "P" is also such a value, which can be optionally selected. In the fourth embodiment, the work volume of the compressor for the predetermined operational period is made smaller, as the work-volume change-rate "P" becomes larger.

In the fourth embodiment, it is possible to select such a vehicle control system, according to which importance is attached to the drivability of the vehicle or the life-time of the A/C apparatus 15. Alternatively, it is possible to select such a vehicle control system, according to which importance is attached to improvement of the fuel consumption ratio. The above selection is done by optionally setting the work-volume change-rate "P". A trade-off between the drivability and the fuel consumption ratio is optimized. For example, the selected compressor-control pattern is corrected in such a manner that the inclination thereof is made smaller as the work-volume change-rate "P" becomes larger. In other words, the work volume of the compressor for the predetermined operational period after the correction becomes smaller than that before the correction.

It is further possible to limit a changing rate of the compressor capacity by use of the work-volume change-rate "P", in order to suppress a rapid change of the compressor capacity.

Figure 11:
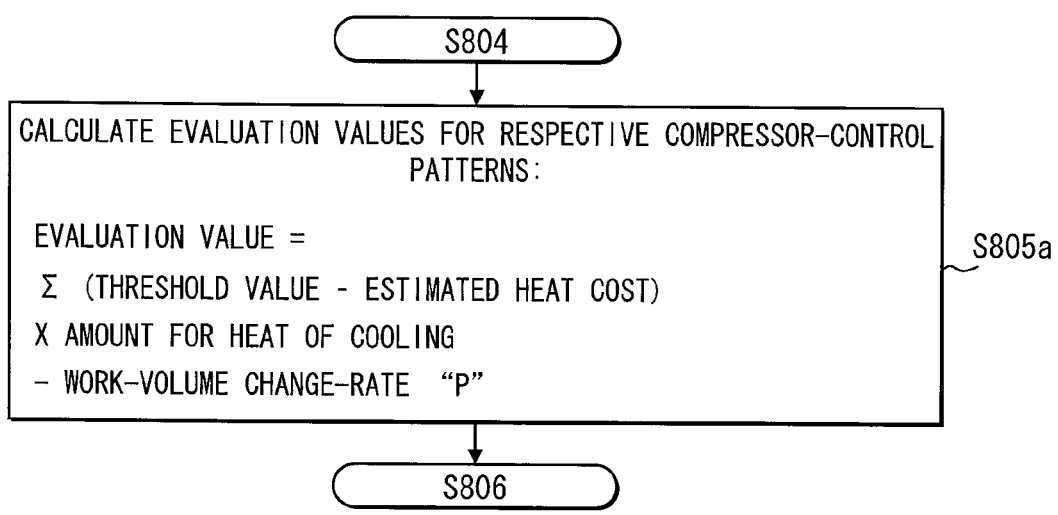
FIG. 11 is apart of a flow-chart showing a process of a fourth embodiment of the present disclosure.

FIG. 11 shows a part of the flowchart of the fourth embodiment. In the fourth embodiment, the evaluation value is calculated based on the following formula 4:

$$\text{Evaluation value} = \Sigma(\text{"the threshold value"} - \text{"the cooling efficiency"}) \times \text{"the amount for the heat of cooling"} - \text{"the work-volume change-rate "P"" }\quad \text{(Formula 4)}$$

According to the above formula 4, an opportunity is increased due to the item of "the work-volume change-rate "P"", according to which the evaluation value becomes a negative figure and thereby the compressor 1 is stopped. As a result, the trade-off between the drivability (or the life-time of the A/C apparatus) and the fuel consumption ratio can be properly balanced. A step S805a of FIG. 11 is used in place of the step S805 of the flowchart in FIG. 8.

As above, according to the fourth embodiment, the work-volume change-rate "P" which can be optionally selected is set as the value having the influence on the drivability of the vehicle or the life-time of the A/C apparatus 15. Probability of a case, in which the evaluation value becomes negative value, is increased, as the work-volume change-rate "P" becomes larger. As a result, the work volume of the compressor is decreased for the predetermined operational period when the compressor is operated in accordance with the selected compressor-control pattern.

Fifth Embodiment

A fifth embodiment of the present disclosure will be explained.

In the first embodiment, the A/C apparatus corresponds to the accessory device driven by the engine. However, the present disclosure can be also applied to a vehicle control system in which the engine has an electric power generator (such as, an alternator 150) as the accessory device.

Figure 12:
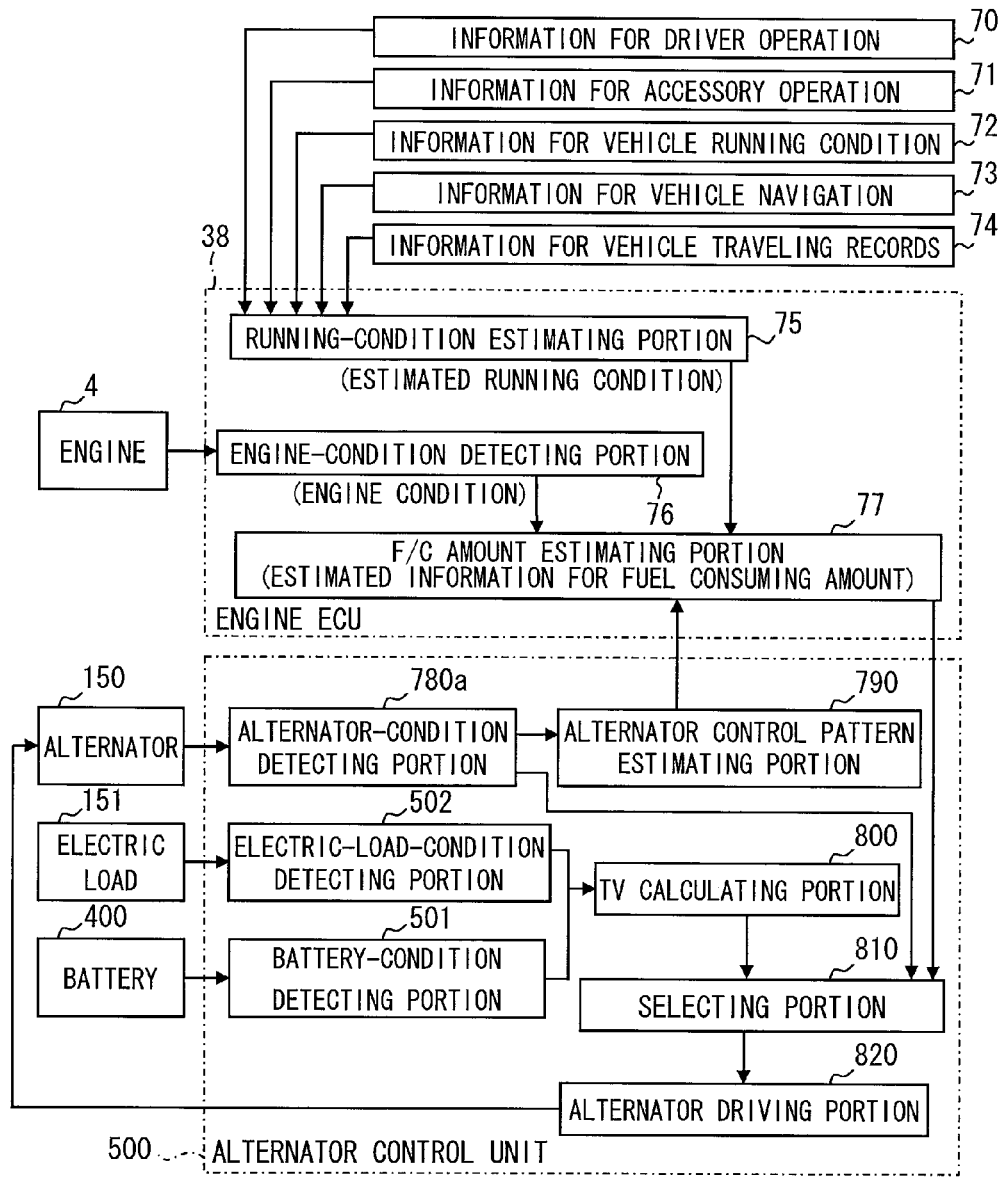
FIG. 12 is a block diagram showing a system structure of a fifth embodiment of the present disclosure.

The fifth embodiment will be explained with reference to FIG. 12. The vehicle control system is composed of the engine ECU 38 and an alternator control unit 500.

As in the same manner to the first embodiment (FIG. 3), the engine ECU 38 receives the information 70 for the driver's operation (for example, the information for the operation of the acceleration pedal), the information 71 for the accessory operation (for example, the information for the cooling operation of the A/C apparatus), the information 72 for the vehicle running condition (for example, the vehicle speed), the information 73 for the vehicle navigation (for example, the speed limit, the traffic information, the sloping roads), the information 74 for the vehicle traveling record (for example, the probability of the case, in which the vehicle will be parked in the parking place of 1,000 meters ahead, is 80%), and so on. The engine ECU 38 estimates the running condition of the vehicle in the predetermined estimation period, based on the above information. The running condition of the vehicle in the predetermined estimation period includes the vehicle speed, the vehicle acceleration and the engine load, which are closely related to the fuel consumption ratio for the engine.

The engine ECU 38 (the fuel-consuming-amount estimating portion 77=the F/C amount estimating portion 77) calculates the fuel consuming amount, based on the estimated running condition of the vehicle as well as the engine condition detected by the engine condition detecting portion 76 (for example, information of an engine warm-up condition), by way of characteristics for the engine efficiency. The fuel consuming amount corresponds to the fuel amount necessary for operating the alternator 150 in accordance with respective alternator-control patterns. Calculation result (the estimated information for fuel consuming amount of the engine 4) is transmitted to the alternator control unit 500.

The fuel consuming amount is estimated based on a map for characteristic curves of iso-fuel-consumption-ratio for the engine. Instead of the fuel consuming amount for operating the alternator, fuel consumption ratio (that is, the fuel consuming amount with respect to unit time and unit torque) for operating the alternator can be used.

The alternator control unit 500 has a detection-memory portion 501 for detecting and memorizing condition of a battery 400 (a battery SOC=a state-of-charge of the battery) and a detection-memory portion 502 for detecting and memorizing information for electric loads as well as vehicle condition related to the electric loads (for example, operational conditions for a wiper, a heater, a blower motor, the navigation device and so on). A threshold-value calculating portion 800 (hereinafter, the TV calculating portion)) of the alternator control unit 500 calculates and sets the threshold values based on the information stored in the detection-memory portions 501 and 502.

The battery SOC is a unit showing a charged condition of the battery 400, namely a ratio (percentage) of a remaining amount for charged energy with respect to a full amount for the charged energy. In other words, SOC 100% shows that the battery is fully charged, SOC 50% indicates that the remaining amount of the charged energy is a half, and SOC 0% means that the battery is fully discharged.

More in detail, an alternator-control-pattern estimating portion 790 (hereinafter, the ACP estimating portion 790) of the alternator control unit 500 calculates (estimates) multiple alternator-control patterns based on an alternator condition detected by an alternator-condition detecting portion 780a (and based on, as the case may be, information related to the engine having information for estimated fuel consumption ratio).

The estimated alternator-control patterns are transmitted to the engine ECU 38. The F/C amount estimating portion 77 calculates the fuel consuming amount (or fuel consumption ratio) which will be necessary for the engine 4 to drive the alternator 150, when the alternator 150 is operated in accordance with each of the alternator-control patterns. The fuel consuming amount (or the fuel consumption ratio), which is calculated by the F/C amount estimating portion 77, is transmitted to a selecting portion 810 of the alternator control unit 500. The selecting portion 810 calculates driving efficiency for the respective alternator-control patterns by use of power generation efficiency of the alternator 150 (that is, a ratio of output with respect to input for the alternator 150).

The selecting portion 810 evaluates the respective alternator-control patterns based on the driving efficiency and amount of electricity to be generated by use of an evaluation formula. For example, the selecting portion 810 calculates respective evaluation values based on the following evaluation formula 5 and selects such alternator-control pattern which has a maximum evaluation value.

Evaluation value=Σ("Threshold value"−"Estimated Electricity Cost")×"Amount of Electricity to be generated" (Formula 5)

The above evaluation value is calculated for the predetermined estimation period at predetermined intervals. In the above formula 5, the following relationship is satisfied:

Estimated driving efficiency=1/"Estimated Electricity Cost"="Estimated amount of electricity to be generated"/"Estimated amount of fuel necessary for driving the alternator"

Therefore, the driving efficiency corresponds to an inverse number of the estimated electricity cost. The driving efficiency further corresponds to a ratio the amount of electricity to be generated with respect to the fuel amount necessary for driving the alternator.

Operation and Advantages of the Fifth Embodiment

In the vehicle control system, in which the electric power is generated by the alternator 150, the electricity generated by the alternator 150 operated with driving force of the engine 4 is charged into the battery 400. When the generated amount of the electricity by the alternator 150 is small, the electric power is discharged from the battery 400 so as to operate the electric loads mounted in the vehicle.

The engine ECU 38 estimates the running condition of the vehicle for the predetermined estimation period, wherein the running condition of the vehicle influences on the engine condition. The engine ECU 38 estimates, based on the estimated running condition of the vehicle, the engine condition related to electric-power generation efficiency of the alternator 150. The running-condition estimating portion 75, the engine-condition detecting portion 76 and F/C amount estimating portion 77 are collectively referred to as an engine-condition estimating portion 75-77.

The alternator control unit 500 calculates values related to the electric-power generation efficiency based on the estimated engine condition (estimated by the engine ECU 38) for the respective cases, in which the alternator 150 is operated by the engine 4 in accordance with each of the alternator-control patterns.

The alternator control unit 500 (the selecting portion 810) selects the most appropriate alternator-control pattern from the multiple alternator-control patterns based on the values related to the electric-power generation efficiency. Then, the alternator 150 is controlled in accordance with such selected alternator-control pattern. More exactly, field current to the alternator 150 is controlled.

According to the above structure and operation of the fifth embodiment, it is possible to calculate the values related to the electric-power generation efficiency for the respective cases, in which the alternator 150 is operated in accordance with each of the alternator-control patterns, based on the estimated engine condition. Then, it is possible to select the most appropriate alternator-control pattern (which has high effectiveness for reducing the fuel consuming amount) based on the values related to the electric-power generation efficiency.

Accordingly, optimization for saving the fuel consuming amount is possible not only in the period shortly before the vehicle decelerating operation but also in the longer period. In other words, in the whole operating period of the alternator 150, the most appropriate alternator-control pattern (which has the high effectiveness for reducing the fuel consuming amount) is selected and the alternator is operated in accordance with such selected alternator-control pattern. Accordingly, the effectiveness for reducing the fuel consuming amount becomes larger.

Figure 14A:
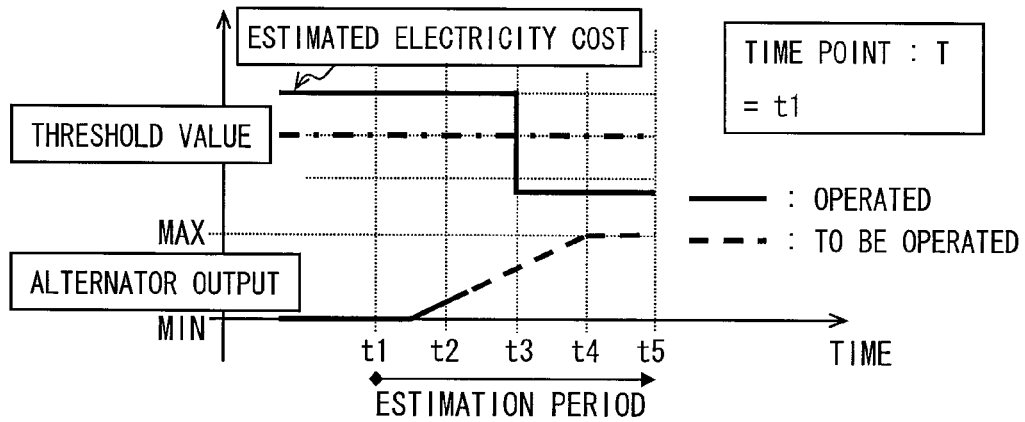
FIGS. 14A to 14C are time-charts respectively showing operating patterns of an alternator according to the fifth embodiment.
Figure 14B:
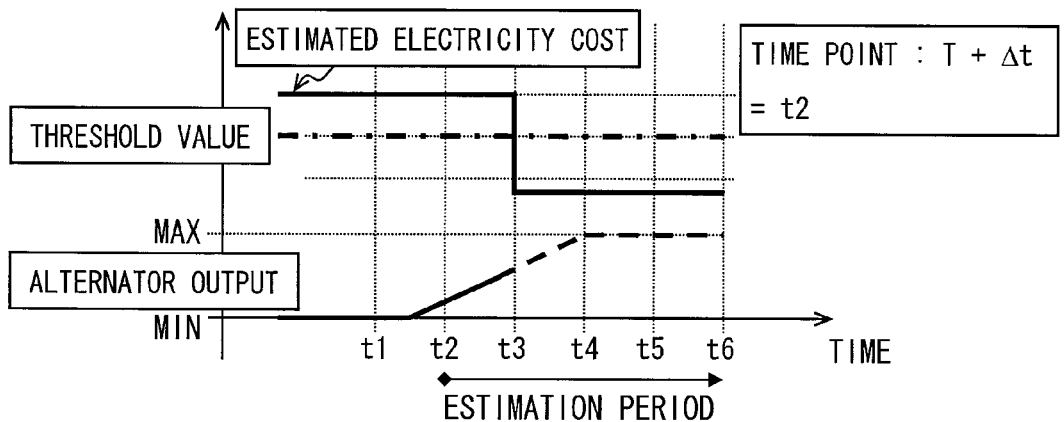
Figure 14C:
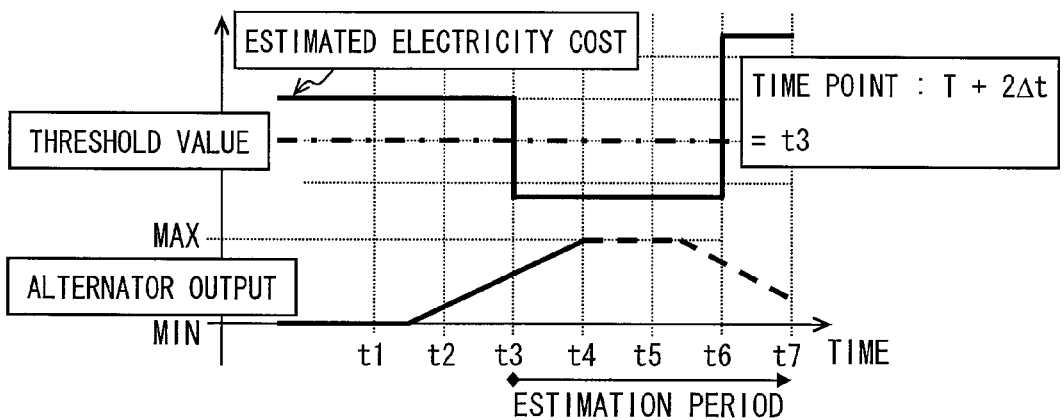

FIGS. 14A to 14C are graphs for characteristic lines showing control results, when the alternator is operated in accordance with the selected alternator-control pattern. In case of the example of FIGS. 14A to 14C, the field current is changed as a parameter for the alternator-control pattern, and the field current for the alternator is increased. The estimated electricity cost (that is, the electric-power generation cost) is not actually decreased in a right-angle shape but gradually decreased in actual cases. However, in FIGS. 14A to 14C, the estimated electricity cost (the estimated electric-power generation cost) is indicated as being decreased in the right-angle shape, for the purpose of explaining the operation in a simple manner.

As shown in FIGS. 14A to 14C, at each of time points T, T+Δt and T+2Δt, the evaluation value is calculated for each of the alternator-control patterns by use of the evaluation formula (the formula 5). Each of the evaluation values is calculated at a constant calculation interval "Δt" for a predetermined estimation period to an estimation end point. The alternator-control pattern, which has the maximum evaluation value, is selected and the alternator is operated in accordance with such selected alternator-control pattern for a subsequent operational time period (which corresponds to the calculation interval "Δt".

At the time point T (more exactly, in the operational time period from t1 to t2), as shown in FIG. 14A, the amount of electric-power generated by the alternator 150 is increased before the estimated electricity (the electric-power generation cost) becomes lower than the threshold value.

More exactly, at the time point t1 (the current time point T), the alternator control unit 500 estimates the evaluation value (that is, the estimated electric-power generation cost) for the estimation period of t1-t5. In the case of FIG. 14A, the alternator control unit 500 estimates that the electric-power generation cost would be lower than the threshold value at the estimation end point t5. Therefore, the alternator control unit 500 increases the amount of the electric-power generation by the alternator for the subsequent operational time period of t1-t2.

At the time point T+Δt, as shown in FIG. 14B, the alternator-control pattern, which has been selected at the previous time point t1, is maintained (for the operational time period from t2 to t3). The electric-power generation of the alternator 150 is restricted, so that the electric-power generation of the alternator 150 does not exceed the maximum power generation amount (MAX).

More exactly, at the time point t2, the alternator control unit 500 estimates the evaluation value (the estimated electric-power generation cost) for the estimation period of t2-t6. In the case of FIG. 14B, the alternator control unit 500 estimates that the electric-power generation cost would be still lower than the threshold value at the estimation end point t6. Accordingly, the increase of the power generation of the alternator 150 is maintained for the subsequent operational time period of t2-t3.

At the time point T+2Δt, as shown in FIG. 14C, the alternator-control pattern is selected, so that the electric-power generation of the alternator 150 will be decreased in the operational time period of t5-t6 before the estimated electric-power generation cost becomes higher than the threshold value.

More exactly, at the time point t3, the alternator control unit 500 estimates the evaluation value (the estimated electric-power generation cost) for the estimation period of t3-t7. In the case of FIG. 14C, the alternator control unit 500 estimates that the electric-power generation cost would become higher than the threshold value at the estimation end point t7. Accordingly, the electric-power generation of the alternator 150 will be decreased in the operational time period of t5-t6. Depending on the circumstances, the decrease of the electric-power generation may start in the subsequent operation period of t4-t5.

Figure 15:
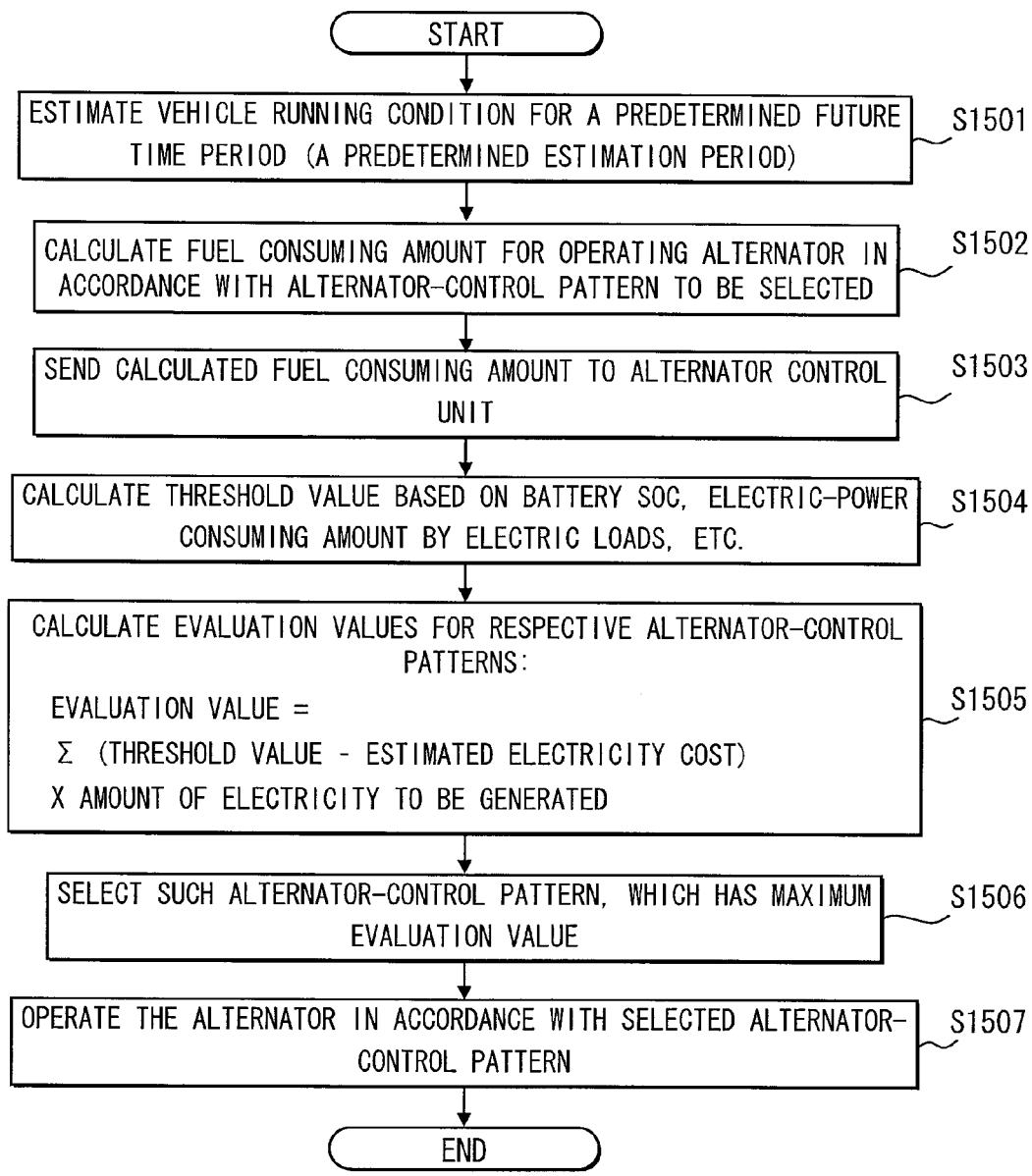
FIG. 15 is a flow-chart showing a process for controlling the vehicle control system of the fifth embodiment.

FIG. 15 is a flowchart showing a process for the fifth embodiment. At a step S1501, the engine ECU 38 estimates the running condition and the engine condition relating to the engine rotational speed and the engine torque for the predetermined future time period (corresponding to the estimation period).

At a step S1502, the engine ECU 38 calculates the fuel consuming amount by use of the characteristics for engine efficiency based on the estimated running condition and the estimated engine condition, wherein the fuel consuming amount is necessary for operating the alternator 150 in accordance with the selected alternator-control pattern so as to charge electric energy (the electric power) in the battery 400.

At a step S1503, the fuel consuming amount (which is calculated by the engine ECU 38 and which is necessary for operating the alternator 150 in accordance with the selected alternator-control pattern) is sent to the alternator control unit 500.

Figure 13:
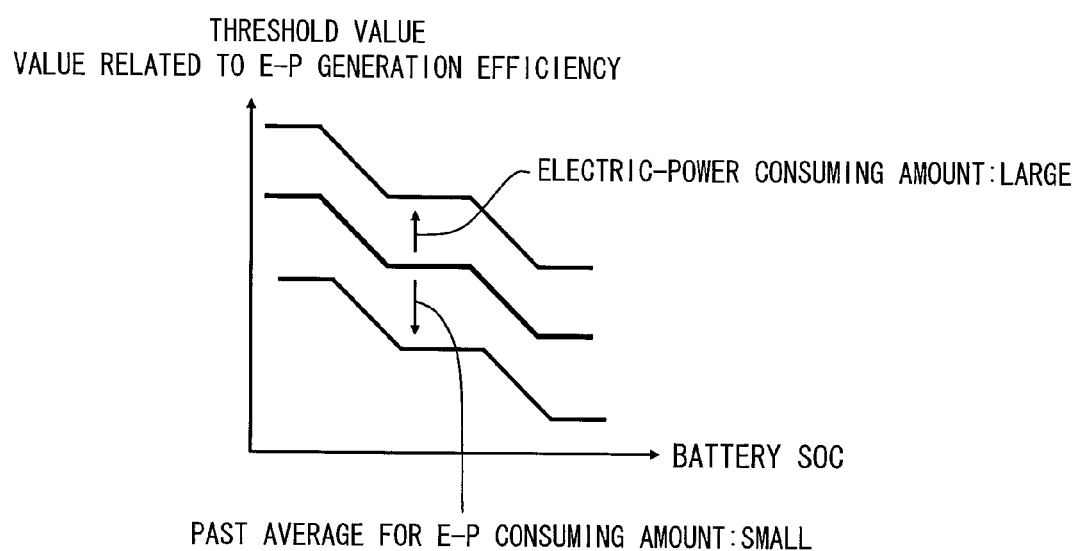
FIG. 13 is a graph showing characteristic curves used in the fifth embodiment for calculating threshold values.

At a step S1504, the alternator control unit 500 calculates the threshold values by use of a map of FIG. 13 based on the battery SOC, the electricity consuming amount by the electrical loads, the average electric-power generation cost in the past and so on.

At a step S1505, the alternator control unit 500 calculates the electric-power generation cost (the estimated electricity cost). As already explained above, the following relationship is satisfied:

the driving efficiency=1/the electric-power generation cost=the amount of the electric-power to be generated/the fuel consuming amount for driving the alternator.

In other words, the driving efficiency is the inverse number of the electric-power generation cost. In addition, the driving efficiency corresponds to the electric-power amount to be generated by the alternator with respect to the fuel consuming amount for driving the alternator. Accordingly, the driving efficiency (that is, the electric-power amount to be generated with respect to the fuel consuming amount for driving the alternator) is calculated at first. And then, the inverse number of the driving efficiency is calculated so as to estimate the electric-power generation cost (the estimated electricity cost).

In addition, the alternator control unit 500 calculates the evaluation values by use of the evaluation formula (the formula 5) based on the threshold values. As already explained above, the evaluation values are calculated for the respective alternator-control patterns. According to the evaluation formula (the formula 5), each of the evaluation values is obtained by subtracting the estimated electricity cost from the threshold value and then such subtracted value is multiplied by the electric-power amount to be generated (that is, the amount of electricity to be generated). Accordingly, the evaluation value shows such a value related to the fuel amount, which can be saved according to the present embodiment.

At a step S1506, the alternator control unit 500 selects such alternator-control pattern, which has a maximum evaluation value, namely according to which the fuel consuming amount can be saved at a maximum level.

At a step S1507, the alternator control unit 500 sends a control signal to a regulator provided in the alternator 150 in accordance with the selected alternator-control pattern so as to drive the alternator 150 accordingly.

The fifth embodiment further has the following structure and operation, when the fifth embodiment is observed from a different view point. In a vehicle control system, in which an accessory device (for example, the alternator 150) is driven by an engine 4, a control unit (the engine ECU 38 and the alternator control unit 500) estimates a vehicle running condition for a predetermined estimation period. The vehicle running condition will influence on an operating condition of the engine (the engine condition). The control unit has an engine-condition estimating section (corresponding to the step S1501), which estimates the engine condition related to operation efficiency of the accessory device (the alternator 150), based on an estimated running condition at an estimation end point.

The control unit (38, 500) further has a calculating section (corresponding to the step S1505), which calculates such values related to the operation efficiency of the accessory device (the alternator 150) based on the estimated engine condition (estimated by the engine-condition estimating section corresponding to the step S1501), for the cases in which the accessory device (the alternator 150) is operated in accordance with respective operating patterns (the respective alternator-control patterns).

The control unit (38, 500) further has a selecting section (corresponding to the step S1506), which selects the most appropriate operating pattern from the multiple operating patterns, based on the values related to the operation efficiency of the accessory device.

The control unit (38, 500) further has a driving section (corresponding to the step S1507), which drives the accessory device (the alternator 150) in accordance with the selected operating pattern.

According to the above structure and operation, it is possible to calculate the values related to the operation efficiency of the accessory device based on the estimated engine condition, for such cases in which the accessory device is operated in accordance with the respective operating patterns. It is possible to select the most appropriate operating pattern having the highest effect for reducing the fuel consuming amount, based on the above calculated value related to the operation efficiency. The most appropriate operating pattern is selected and the accessory device is operated in accordance with such selected operating pattern. The optimization for reducing the fuel consuming amount is possible not only for the period shortly before the vehicle decelerating operation but also for the longer period. Namely, since the accessory device is operated in accordance with the appropriate operating pattern in the almost whole operating period of the accessory device, the effectiveness for reducing the fuel consuming amount becomes larger.

In the above structure and operation, the accessory device is composed of the alternator 150 driven by the engine 4 and generates the electric power to be supplied to and/or charged in the electric loads of the vehicle and the battery 400. The engine-condition estimating section (corresponding to the step S1501) estimates the vehicle running condition (which has an influence on the operational condition of the engine 4) for the predetermined estimation period. And the engine-condition estimating section (corresponding to the step S1501) estimates the engine condition related to the electric-power generation efficiency of the alternator 150, based on the estimated running condition of the vehicle at the estimation end point.

The calculating section (corresponding to the step S1505) calculates the values related to the electric-power generation efficiency of the alternator 150, based on the estimated engine condition (estimated by the engine-condition estimating section), for the cases in which the alternator 150 is operated in accordance with respective alternator-control patterns.

The selecting section (corresponding to the step S1506) selects the most appropriate alternator-control pattern from the multiple alternator-control patterns, at least based on the values related to the electric-power generation efficiency. The driving section (corresponding to the step S1507) drives the alternator 150 in accordance with the most appropriate alternator-control pattern.

According to the above structure and operation, it is possible to calculate, based on the estimated engine condition, the values related to the electric-power generation efficiency for the cases in which the alternator 150 is operated in accordance with the respective alternator-control patterns. It is, then, possible to select, based on the value related to the electric-power generation efficiency, the most appropriate alternator-control pattern having the highest effectiveness for reducing the fuel consuming amount.

As a result, the optimization for reducing the fuel consuming amount is possible not only for the period shortly before the vehicle decelerating operation but also for the longer period. In other words, in almost whole operating period of the alternator 150, the most appropriate alternator-control pattern having the high effect for reducing the fuel consuming amount is selected and the alternator 150 is operated in accordance with such alternator-control pattern. The effect for reducing the fuel consuming amount becomes thereby much larger.

The selecting section (corresponding to the step S1506) selects the most appropriate alternator-control pattern from the multiple alternator-control patterns, based on the threshold value related to the electric-power generation efficiency (which corresponds to a required level of the alternator 150 at the estimation end point) as well as the value related to the electric-power generation efficiency at the estimation end point.

According to the above structure and operation, it is possible to calculate, based on the estimated engine condition, the values related to the electric-power generation efficiency for the cases in which the alternator 150 is operated in accordance with the respective alternator-control patterns. It is possible to select the most appropriate alternator-control pattern having the highest effectiveness for reducing the fuel consuming amount from the multiple alternator-control patterns, based on the values related to the electric-power generation efficiency as well as the threshold value at the estimation end point.

In addition, the alternator 150 supplies its generated electric-power to the battery 400, wherein the electric power charged in the battery 400 is then supplied to the electric loads. According to the above operation, the electric power can be charged into the battery when the operation efficiency of the engine 4 is high. A period, in which the electric power is supplied from the battery 400 to the electric loads without the electric-power generation by the alternator 150, can be elongated. It is, thereby, possible to operate the alternator 150 in accordance with the alternator-control pattern having the high effect for reducing the fuel consuming amount.

According to the fifth embodiment, as shown in the step S1505 of FIG. 15, the value related to the electric-power generation efficiency (that is, the estimated electricity cost) is compared with the threshold value. In other words, the difference value between them is calculated. The threshold value corresponds to the value showing the charged condition of the battery 400, namely the ratio of the remaining amount for the charged energy with respect to the full amount for the charged energy. When the electric-power generation efficiency of the alternator 150 is high, the work volume for the alternator 150 is increased.

According to the above structure and operation, the period, in which the electric power is supplied to the electric loads without the electric-power generation by the alternator 150, is elongated because of the battery 400. In addition, since the value related to the electric-power generation efficiency (that is, the estimated electricity cost) is compared with the threshold value, and since the work volume of the alternator 150 is increased when the electric-power generation of the alternator 150 is high so as to charge the generated electric power into the battery 400, it is possible to properly operate the alternator 150 and thereby the fuel consumption ratio is largely improved.

The value related to the electric-power generation efficiency corresponds to the estimated electricity cost, which is defined by the ratio of the fuel consuming amount (which is necessary for driving the alternator in accordance with the alternator-control pattern) with respect to the amount of the electric power to be generated (which is generated by the electric-power generating operation with such fuel consuming amount). The above fuel consuming amount as well as the amount for the electric power to be generated is calculated based on the estimated engine condition estimated by the engine-condition estimating section (corresponding to the step S1501).

As above, it is possible to calculate, based on the estimated engine condition, not only the fuel consuming amount necessary for driving the alternator in accordance with the alternator-control patterns but also the amount of the electric power to be generated by such fuel consuming amount. The estimated electricity cost, which is the ratio of the fuel consuming amount with respect to the amount of the electric power to be generated, corresponds to the value related to the electric-power generation efficiency (that is, the inverse number of the electric-power generation efficiency). The most appropriate alternator-control pattern (having the highest effectiveness for reducing the fuel consuming amount) is thus selected based on the estimated electricity cost.

The threshold value becomes smaller, as the amount of the electric power to be generated by the alternator 150 and to be charged in the battery 400 is increased. The threshold value has the same dimension to that of the estimated electricity cost. The selecting section (corresponding to the step S1506) selects the most appropriate alternator-control pattern through the comparison between the estimated electricity cost and the threshold value.

The selecting section (corresponding to the step S1506) compares the estimated electricity cost with the threshold value, which is decreased as the charged amount of the electric power is increased, so as to select the most appropriate alternator-control pattern. As a result, it is possible to increase the electric-power generating amount of the alternator 150 during the predetermined operational period (in the estimation period) when the alternator control unit estimates that the electric-power generation efficiency will become higher. The work volume of the alternator 150 is thus increased.

The alternator-control pattern is selected based on the magnitude relation between the estimated electricity cost (related to the electric-power generation efficiency) and the threshold value. When the electric-power generation efficiency is estimated to be increased, such alternator-control pattern is selected so that the work volume of the alternator 150 is increased for the predetermined operational period (in the estimation period). According to such operation, since the electric-power generation of the alternator is positively utilized when the alternator is operated at the high efficiency, it is possible to realize the operation of the alternator having the high effect for reducing the fuel consuming amount.

The alternator-control pattern is selected based on the difference value between the estimated electricity cost (related to the electric-power generation efficiency) and the threshold value. When the difference value is large and the electric-power generation efficiency is estimated to become larger, such alternator-control pattern is selected so that the electric-power generation amount is increased for the predetermined operational period (in the estimation period). As above, the electric-power generation of the alternator can be positively utilized, when the alternator 150 is operated at the high efficiency.

The threshold value is calculated at least based on the charged condition of the electric energy in the battery 400 (the battery SOC) as well as the value representing the electric-power consuming amount by the electric loads at the estimation end point, as shown in FIG. 13. Since the threshold value corresponds to the value related to not only the charged condition of the electric energy in the battery 400 but also the electric-power consuming amount by the electric loads (to which the electric power generated at the alternator is supplied), it is possible to more exactly decide the threshold value. In other words, it is possible to more properly select the alternator-control pattern by taking the electric-power consuming amount into consideration.

The alternator control unit learns the past records for the threshold values so as to set the threshold values in the subsequent processes. For example, the threshold value is made smaller as the past threshold value was smaller. Since it is possible to set the threshold value as the value more exactly reflecting the actual situation, the fuel consuming amount can be more effectively reduced. In addition, since it is possible to correctly set the threshold value even when the operational condition of the vehicle or the place of destination for the vehicle is different from vehicle to vehicle, the fuel consumption ratio can be surely improved.

The alternator control unit calculates (at the step S1502 of FIG. 15) the fuel consuming amounts which can be saved for the respective alternator-control patterns, based on the threshold value, the value related to the electric-power generation efficiency and the amount of the electric-power necessary for realizing a desired power-supply condition to the electric loads as well as to the battery. Then (at the step S1506 of FIG. 15), the alternator control unit selects the alternator-control pattern which has the maximum fuel consuming amount to be saved.

According to the above operation, it is possible to calculate the fuel consuming amount which can be saved, by taking into the consideration the value related to the estimated electric-power generation efficiency and the threshold value. Since the alternator can be operated based on the evaluation value (that is, the fuel consuming amount) in the circumstances that the alternator is operated at the high efficiency, it is possible to realize the electric-power generating operation having the high effectiveness for reducing the fuel consuming amount. In addition, a high cost performance can be obtained, because the computing load is not large.

The alternator control unit 500 transmits the selected alternator-control pattern to the engine ECU 38 for controlling the engine 4, so as to totally control the torque for the alternator 150 (that is, the alternator driving torque) and the torque for the engine 4 (that is, the vehicle traveling torque). According to such total control, the engine 4 outputs the engine torque by taking the torque for the alternator into consideration. As a result, even when the work volume for the alternator 150 is largely changed for the predetermined operational period, the engine torque is correspondingly changed so as to improve drivability of the vehicle.

Sixth Embodiment

A sixth embodiment of the present disclosure will be explained.

In the above embodiments, multiple control patterns (for example, the compressor-control patterns, the alternator-control patterns) are set in advance and then the most appropriate control pattern is selected from such multiple patterns.

In the sixth embodiment, however, the most appropriate control pattern is calculated from the beginning.

Figure 16:
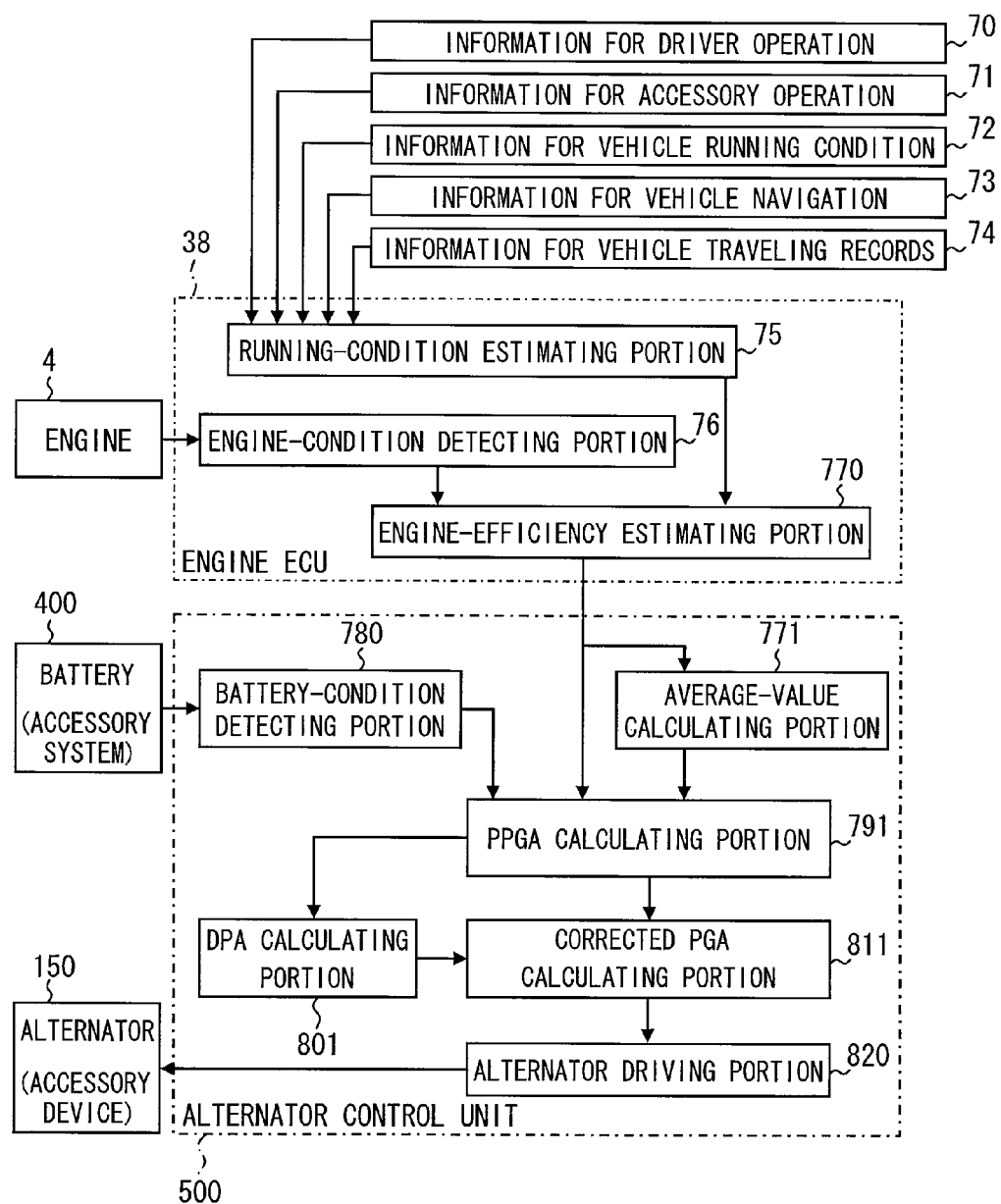
FIG. 16 is a block diagram showing a system structure of a sixth embodiment of the present disclosure.

FIG. 16 is a block diagram showing a system structure of the sixth embodiment of the present disclosure. According to the sixth embodiment, a vehicle control system estimates vehicle acceleration, vehicle deceleration, sloping roads, running speed and so on (hereinafter, collectively, estimated vehicle condition), based on the information including the driver's operation, the navigation information, the past records for the vehicle running condition. The above estimation is done not only for a specific vehicle running condition but also for a normal vehicle running condition. The vehicle control system further estimates the fuel consuming amount of the driving source or the operation efficiency of the accessory device (for example, the electric-power generation efficiency of the alternator) for the predetermined estimation period, based on the estimated vehicle condition. Then, the vehicle control system calculates the most appropriate accessory-control pattern, so as to reduce the fuel consuming amount.

In FIG. 16, the vehicle control system is composed of the engine ECU 38 and the alternator control unit 500.

As in the same manner to the first embodiment or the fifth embodiment, the engine ECU 38 receives the information 70 for the driver's operation (for example, information for the operation of the acceleration pedal), the information 71 for the operation of the accessory device (for example, information for the cooling operation of the A/C apparatus), the information 72 for the vehicle running (for example, the vehicle speed), the information 73 for the vehicle navigation (for example, the speed limit, the traffic information, the sloping roads), the information 74 for the vehicle traveling record (for example, the probability of the case, in which the vehicle will be parked in the parking place of 1,000 meters ahead, is 80%), and so on. The engine ECU 38 (the running-condition estimating portion 75) estimates the running condition of the vehicle in the predetermined future time point (the predetermined estimation period), based on the above information.

The running condition of the vehicle (the vehicle running condition) in the predetermined estimation period includes the vehicle speed, the vehicle acceleration and the engine load, which are closely related to the fuel consumption ratio for the engine.

An engine-efficiency estimating portion 770 of the engine ECU 38 estimates engine efficiency for the predetermined estimation period based on the estimated vehicle running condition as well as the engine condition (such as, the engine warming-up condition) detected by the engine-condition detecting portion 76. An average-value calculating portion 771 of the alternator control unit 500 calculates an average value for the engine efficiency.

A calculating portion 791 calculates provisional electric-power generation amounts (KW) of the alternator 150 at time points "t" (multiple time points) in the predetermined estimation period, based on the engine efficiency for such period, the average value of the engine efficiency and battery condition detected by a battery-condition detecting portion 780. The calculating portion 791 is also referred to as a PPGA calculating portion 791.

The battery-condition detecting portion 780 of the alternator control unit 500 memorizes the detected battery condition of the battery 400. The battery-condition detecting portion 780 memorizes not only the actual battery SOC (the state of charge) but also a target battery SOC.

As already explained in the above fifth embodiment, the battery SOC is the unit showing the charged condition of the battery 400, namely the ratio (percentage) of the remaining amount for the charged energy with respect to the full amount for the charged energy. In other words, SOC 100% shows that the battery is fully charged, SOC 50% indicates that the remaining amount of the charged energy is a half, and SOC 0% means that the battery is fully discharged.

As shown in FIG. 16, the alternator control unit 500 is composed of the average-value calculating portion 771 for calculating the average value of the engine efficiency for the predetermined estimation period, the battery-condition detecting portion 780 for detecting (or calculating) and memorizing the actual battery SOC and the target battery SOC for the battery 400, and the PPGA calculating portion 791 for calculating the provisional electric-power generation amounts "PW" (the unit is KW) of the alternator 150 at the time points "t" in the predetermined estimation period.

Furthermore, the alternator control unit 500 is composed of a calculating portion 801 for calculating driving-power amount of the driving source 4 (the engine 4) necessary for driving the alternator 150 so as to generate electric-power corresponding to the provisional electric-power generation amount, to thereby calculate electric-power generation efficiency "δ". The calculating portion 801 is also referred to as "a driving-power amount calculating portion 801" or in short "a DPA calculating portion 801". The alternator control unit 500 further includes a calculating portion 811 for correcting the provisional electric-power generation amount of the alternator 150 at the time point "t" and calculating a corrected electric-power generation amount of the alternator for the predetermined estimation period. In other words, the calculating portion 811 calculates (corrected) alternator-control patterns. The calculating portion 811 is also referred to as "the corrected power-generation-amount calculating portion 811" or in short "the corrected PGA calculating portion 811". The alternator control unit 500 has an alternator driving portion 820 (a driver circuit) for driving the alternator 150 in accordance with the corrected alternator-control pattern. The alternator driving portion 820 controls field current of the alternator 150 so as to obtain the electric-power generation amount indicated by the alternator-control pattern depending on the engine rotational speed and the alternator efficiency.

Figure 17:
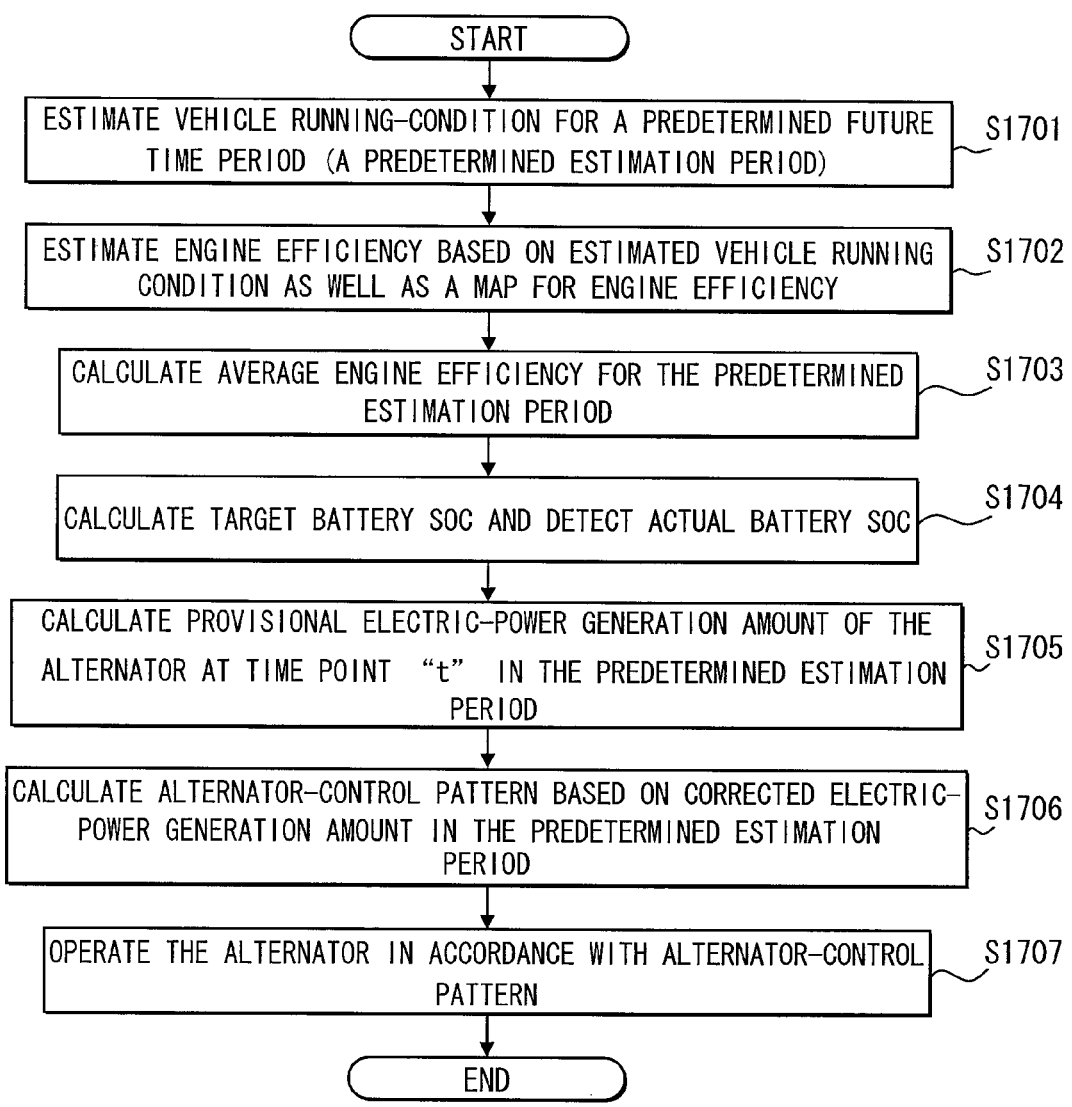
FIG. 17 is a flow-chart showing a process for controlling the vehicle control system of the sixth embodiment.

An operation of the sixth embodiment will be explained with reference to a flowchart of FIG. 17. At a step S1701, the engine ECU 38 estimates the vehicle running condition as well as the engine condition relating to the engine rotational speed and the engine torque for the predetermined estimation period, as in the same manner to the first embodiment. At a step S1702, the engine ECU 38 estimates the engine efficiency based on the estimated vehicle running condition and a map for the engine efficiency.

At a step S1703, the alternator control unit 500 (the average-value calculating portion 771) calculates the average value for the engine efficiency for the predetermined estimation period. At a step S1704, the alternator control unit 500 (the battery-condition detecting portion 780) detects the actual battery SOC and calculates the target battery SOC.

At a step S1705, the alternator control unit 500 (the PPGA calculating portion 791) calculates the provisional electric-power generation amounts PW of the alternator 150 at the time points "t" (multiple time points) in the predetermined estimation period.

In a case that the target battery SOC is larger than the actual battery SOC and the engine efficiency at the time point "t" is larger than the average engine efficiency, the provisional power generation amount "PW" of the alternator 150 at the time point "t" in the predetermined estimation period is calculated based on the following formula 6:

The provisional electric-power generation amount
$PW=k1\times$("the target battery SOC"–"the actual battery SOC")$\times$("the engine efficiency at the time point $t$"–"the average engine efficiency") (Formula 6)

In cases other than the above case (in which the target battery SOC is larger than the actual battery SOC and the engine efficiency at the time point "t" is larger than the average engine efficiency), the provisional electric-power generation amount PW is set to be zero (PW=0).

At a step S1706, the provisional electric-power generation amount at the time point "t" is corrected and then the corrected electric-power generation amount for the predetermined estimation period, that is, the alternator-control pattern is calculated by the corrected PGA calculating portion 811. The alternator control unit 500 (DPA calculating portion 801) calculates the driving-power amount necessary for driving the alternator 150 so as to calculate the electric-power generation efficiency "δ". The provisional electric-power generation amount PW is corrected by use of the following formula 7 based on the electric-power generation efficiency "δ" and a constant number "c".

In this case, the present embodiment is applied to an actual test vehicle, and the constant number "c" as well as adaptation values "k1" and "k2" is set so that average electric-power generation efficiency can be obtained in the actual test vehicle. The constant number "c" as well as the adaptation values "k1" and "k2" are memorized in a map and used for the calculation of the formula 7.

The electric-power generation amount at the time point "$t$"=$PW\times(1+k2(\delta-c)/c)$ (Formula 7)

Then, at a step S1707, the alternator control unit 500 (the alternator driving portion 820) operates the alternator 150 in accordance with the alternator-control pattern.

Operation and Advantages of the Sixth Embodiment

The vehicle control system has the driving source 4 for generating driving power for the vehicle and the accessory device 150 driven by the driving source 4.

The vehicle control system is composed of;

the running-condition estimating portion 75 for estimating the running condition for the predetermined estimation period based on the information related to the vehicle information (the information 70 to 74);

the engine-efficiency estimating portion 770 for estimating the engine efficiency based on the information from the running-condition estimating portion 75 as well as the information for the engine condition (the engine-efficiency estimating portion 770 may be replaced by an operation-efficiency estimating portion for estimating operation efficiency of the driving source 4, such as fuel consuming amount, based on the running condition as well as the information for operating condition of the driving source 4);

the battery-condition detecting portion 780 for detecting the energy-charged condition of the battery 400 (the battery-condition detecting portion 780 may be replaced by an accessory-condition detecting portion for detecting condition of the accessory device 150 or the battery forming an accessory system);

a control-pattern calculating portion (including the PPGA calculating portion 791, the DPA calculating portion 801 and the corrected PGA calculating portion 811) for calculating a control pattern for the accessory device 150 for the predetermined estimation period, based on the estimated operation efficiency (or the fuel consuming amount) of the driving source 4 from the operation-efficiency estimating portion 770 as well as the information for the condition of the accessory device 150 or the accessory system 400 from the accessory-condition detecting portion 780, so that the fuel consuming amount by the driving source 4 becomes minimum when the accessory device 150 is operated in accordance with the calculated control pattern; and an accessory driving portion (the alternator driving portion 820) for driving the accessory device 150 in accordance with the calculated control pattern.

According to the above structure and operation, the vehicle control system estimates the vehicle running condition for the predetermined estimation period, not only in such a specific situation as a vehicle running situation shortly before the deceleration but also in a normal vehicle running situation. The vehicle control system calculates the control pattern depending on the vehicle running condition, according to which the accessory device 150 is operated at high operation efficiency for almost all operating period of the accessory device 150. As a result, the fuel consuming amount for operating the accessory device 150 can be minimized. In other words, the fuel consumption ratio for the driving source 4 can be improved.

The control-pattern calculating portion (791, 801, 811) includes the PPGA calculating portion 791, which calculates the provisional work volume of the accessory device 150 (that is, the provisional electric-power generation amount of the alternator 150) based on the estimated operation efficiency (or the fuel consuming amount) of the driving source 4 from the operation-efficiency estimating portion 770 as well as the information for the condition of the accessory device 150 or the accessory system (the battery) 400 from the accessory-condition detecting portion 780. The PPGA calculating portion 791 is also referred to as a provisional work-volume calculating portion.

The control-pattern calculating portion (791, 801, 811) further includes the DPA calculating portion 801, which calculates the driving-power amount of the driving source 4 necessary for driving the accessory device 150 so as to generate the provisional work volume and calculates the operation efficiency "δ" of the accessory device related to the provisional work volume. The DPA calculating portion 801 is also referred to as an accessory-driving-power amount calculating portion.

Furthermore, the control-pattern calculating portion (791, 801, 811) includes the corrected PGA calculating portion 811, which corrects the provisional work volume of the accessory device 150 and calculates the control pattern for the accessory device 150 (which corresponds to the corrected work volume for the accessory device). The corrected PGA calculating portion 811 is also referred to as a corrected work-volume calculating portion.

According to above structure and operation, the vehicle control system (more exactly, the provisional work-volume calculating portion 791) calculates the estimated provisional work volume of the accessory device, based on the estimated operation efficiency (or the fuel consuming amount) of the driving source as well as the information for the condition of the accessory device 150 or the accessory system 400. The vehicle control system (the accessory-driving-power amount calculating portion 801) calculates the driving-power amount of the driving source necessary for driving the accessory device so as to generate the provisional work volume and further calculates accessory operation efficiency "δ" related to the provisional work volume for the accessory device. And then, the vehicle control system (the corrected work-volume calculating portion 811) corrects the provisional work volume of the accessory device and calculates the control pattern for the accessory device corresponding to the corrected work volume. As a result, it is possible to drive the accessory device 150 in accordance with the above-calculated control pattern, according to which the fuel consuming amount can be minimized.

In addition, the vehicle control system (more exactly, the operation-efficiency estimating portion 770) estimates the operation efficiency of the driving source 4 for the predetermined estimation period based on the estimated vehicle running condition as well as the information for the driving source 4.

The vehicle control system (the average-value calculating portion 771) calculates the average value of the operation efficiency of the driving source 4 for the predetermined estimation period.

Then, the vehicle control system (the provisional work-volume calculating portion 791) calculates the provisional work volume of the accessory device 150 for the predetermined estimation period, based on the operation efficiency of the driving source for the estimation period, the average value of the operation efficiency during the estimation period and the condition of the accessory system 400.

The vehicle control system (the accessory-driving-power amount calculating portion 801) calculates the driving-power amount of the driving source 4 necessary for driving the accessory device 150 so as to generate the provisional work volume and calculates the operation efficiency "δ" of the accessory device 150.

The vehicle control system (the corrected work-volume calculating portion 811) corrects the provisional work volume by use of the operation efficiency "δ" so as to calculate the control pattern (that is, the corrected work volume).

As above, it is possible to estimate the operation efficiency of the driving source 4 for the predetermined estimation period based on the estimated vehicle running condition as well as the information for the driving source 4.

It is possible to calculate the average value of the operation efficiency of the driving source for the predetermined estimation period.

It is possible to calculate the provisional work volume of the accessory device 150 for the predetermined estimation period, based on the operation efficiency of the driving source for the estimation period, the average value of the operation efficiency during the estimation period and the condition of the accessory system 400.

It is possible to calculate the driving-power amount of the driving source 4 necessary for driving the accessory device 150 so as to generate the provisional work volume, so as to calculate the operation efficiency "δ" of the accessory device 150.

It is possible to correct the provisional work volume by use of the operation efficiency "δ" of the accessory device 150 so as to obtain the control pattern for the accessory device 150 (that is, the corrected work volume for the accessory device).

Seventh Embodiment

A seventh embodiment of the present disclosure will be explained.

In the first embodiment, the control unit (the engine ECU 38 and A/C ECU 5) calculates the threshold values, the values related to the cooling efficiency and the amount for heat of cooling (the amount of cooling energy for keeping the passenger compartment in a desired cooling condition) for the respective cases of the multiple compressor-control patterns. Then, the control unit calculates the evaluation values based on the above values and amount by use of the evaluation formula, wherein the evaluation values express the fuel consuming amount to be saved. The control unit selects the compressor-control pattern, which has the maximum evaluation value.

Figure 18:
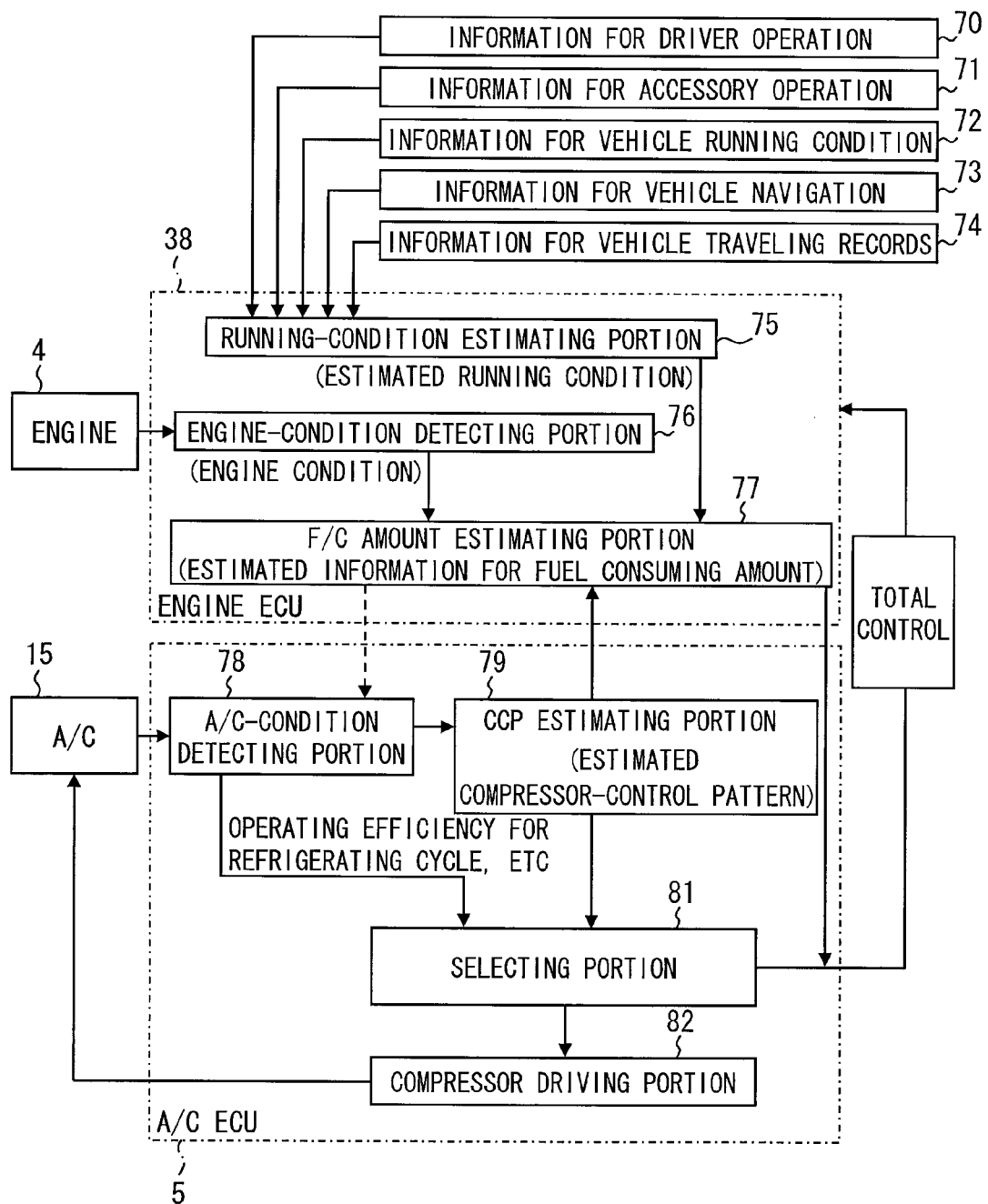
FIG. 18 is a block diagram showing a system structure of a seventh embodiment of the present disclosure.
Figure 19:
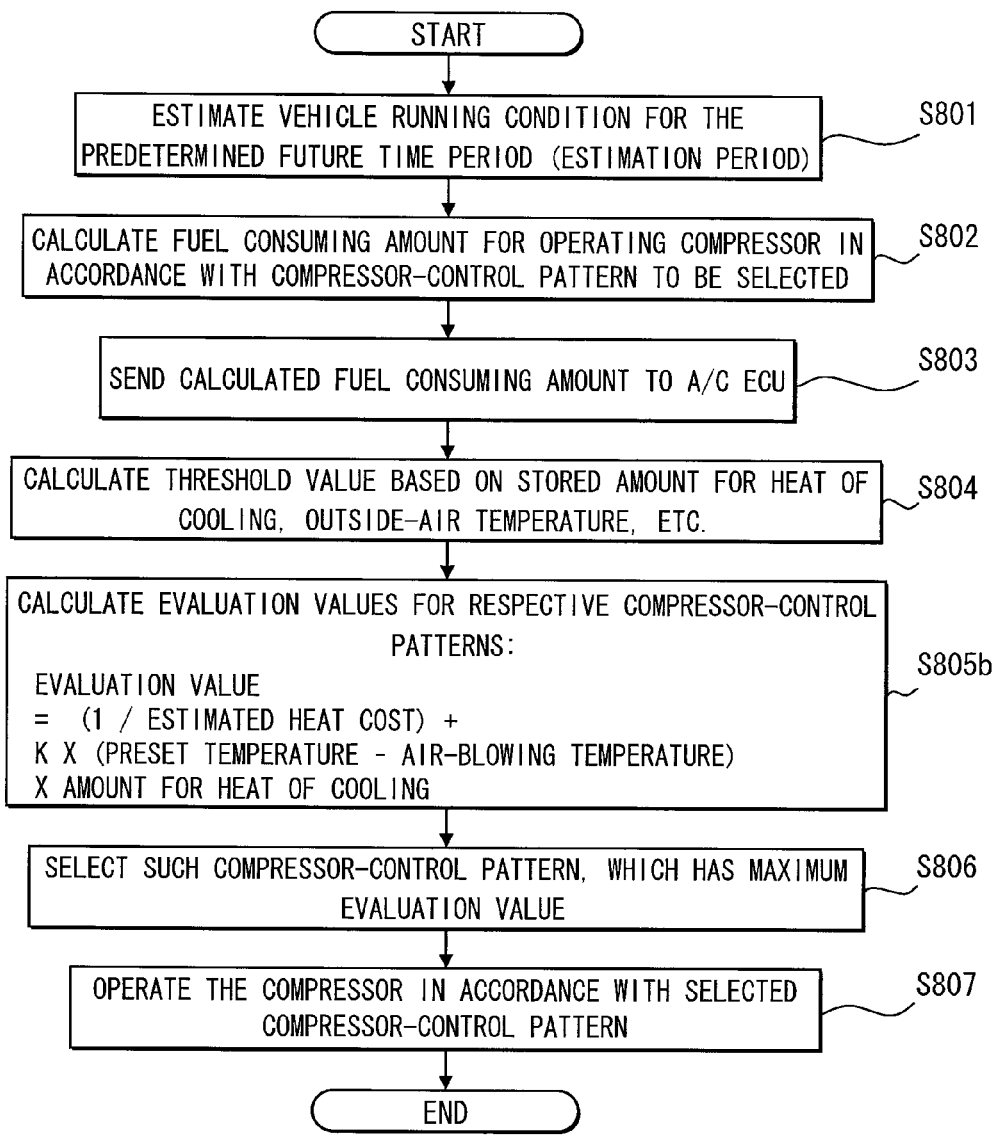
FIG. 19 is a flow-chart showing a process for controlling the vehicle control system of the seventh embodiment.

However, as shown in FIG. 18, the threshold value calculating portion 80 (shown in FIG. 3) may not be provided in the A/C ECU 5. According to the seventh embodiment, as shown in a step S805*b* of FIG. 19, the evaluation values are calculated by use of the following formula 8:

The evaluation value=(1/Estimated Heat Cost)+$K$×
(Preset Temperature−Air-blowing Temperature)×
Amount for heat of cooling  (Formula 8)

In the above formula 8, K is a correction coefficient. As shown in the formula 8, the threshold value is not necessary for calculating the evaluation value. As already explained above, the estimated heat cost is the inverse number of the cooling efficiency. The estimated heat cost is expressed by the ratio of the fuel consuming amount for driving the compressor with respect to the amount for heat of cooling, which is generated by the cooling operation with such fuel consuming amount.

According to the above structure and operation, the compressor-control pattern having a smaller value for the estimated heat cost is basically selected. The control unit determines that the amount for the heat of cooling is likely to become insufficient in the cool-down operation of the A/C apparatus 15, in which the air-blowing temperature is lower than the preset temperature. Therefore, the control unit selects such compressor-control pattern, according to which larger amount for the heat of cooling can be generated. According to the seventh embodiment, it is not necessary to use the threshold values, when calculating the evaluation values, as explained above. The evaluation values can be obtained by calculating the simple formula, in which the estimated heat cost is taken into consideration. The estimated heat cost is the value related to the cooling efficiency for the estimated cooling operation. The compressor is operated when the refrigerating cycle will be operated at high efficiency. Accordingly, the control for the compressor is realized, according to which the fuel consumption ratio can be improved. In addition, since the computing load is not large, a high cost performance can be obtained.

In the step S805*b*, in which the evaluation formula (the formula 8) is used, the most appropriate compressor-control pattern is selected from the multiple compressor-control patterns, based on the value related to deviation between the preset temperature and the air-blowing temperature as well as the values related to the cooling efficiency (such as, the estimated heat cost, the amount for the heat of cooling).

As above, it is possible to select, from the multiple compressor-control patterns, the appropriate compressor-control pattern according to which the fuel consumption ration can be largely improved, based on the values related to the cooling efficiency as well as the value related to the deviation between the preset temperature and the air-blowing temperature. Since the A/C apparatus 15 is operated in such a manner that the compressor-control pattern having the high effectiveness for reducing the fuel consuming amount is selected not only for the period of the vehicle operation shortly before the deceleration but also almost for all of the period of the air-conditioning operation, the effectiveness for reducing the fuel consuming amount becomes much larger.

More in detail, the evaluation values are calculated for the respective compressor-control patterns, by use of the estimated running condition of the vehicle and the engine condition (obtained at the step S801 in FIG. 19) and based on:

(i) the estimated heat cost, which indicates the fuel consuming amount for the unit amount for the heat of cooling, wherein the fuel consuming amount is an amount of fuel necessary for operating the A/C apparatus 15 in accordance with each of the compressor-control patterns;

(ii) the preset temperature of the A/C apparatus 15;

(iii) the air-blowing temperature of the A/C apparatus 15; and (iv) the amount for the heat of cooling necessary for keeping the passenger compartment in the desired cool-down condition.

As indicated by the formula 8, the evaluation value can be obtained by the calculation, according to which two values are added to each other. Namely, the first value corresponds to the value related to the cooling efficiency (that is, 1/the estimated heat cost). The second value is calculated by subtracting the air-blowing temperature from the preset temperature and by multiplying such subtracted amount by the amount for the heat of cooling and the correction coefficient.

The compressor-control pattern is basically selected based on the first value, that is, the value related to the cooling efficiency (that is, 1/the estimated heat cost). The unit of the first value is calorie/liter. Therefore, the compressor-control pattern having the larger value related to the cooling efficiency is selected.

The second value (that is, K×(Preset Temperature−Airblowing Temperature)×Amount for heat of cooling) becomes larger, as the amount for the heat of cooling to be generated becomes larger and the air-blowing temperature becomes lower. Since the above second value is taken into consideration (included in the formula 8), it is possible to select such compressor-control pattern, according to which the compressor is driven in the circumstance that the refrigerating cycle can be operated at high efficiency. Accordingly, it is possible to realize the control of the A/C apparatus 15 having the high effect for reducing the fuel consuming amount. In addition, the computing load is not large, so that the high cost performance can be obtained. In a case that all of the evaluation values for the respective compressor-control patterns become smaller than a predetermined value, the compressor is not operated.

In a case that the air-blowing temperature is estimated to become lower than the preset temperature and thereby the difference value between them (that is, the value=the preset temperature−the air-blowing temperature) is estimated to become larger, the high cooling operation is required. For example, it corresponds to the cooling-down operation, which is carried out when the passenger enters the vehicle. Therefore, in such a case, the compressor-control pattern is selected so that the larger amount for the heat of cooling can be obtained.

Advantages of the Seventh Embodiment

In FIG. 18, a control-pattern calculating section (79, 81) is composed of a control-pattern estimating portion 79 (corresponding to the CCP estimating portion 79) for estimating multiple control patterns and a control-pattern selecting portion 81 (corresponding to the selecting portion 81). The control-pattern selecting portion 81 selects, from the multiple control patterns, the control pattern having the highest operation efficiency, based on the information (including the preset temperature, the air-blowing temperature, the amount for the heat of cooling) from an accessory-condition detecting portion 78 (corresponding to the A/C-condition detecting portion 78) and based on the information (the estimated heat cost) related to the operation efficiency of the accessory device (for example, the compressor 1) or the accessory system (the A/C apparatus 15).

According to such structure and operation, it is possible to select the control pattern having the highest operation efficiency, without using the threshold values. Therefore, the system structure becomes simpler.

More exactly, the control-pattern selecting portion 81 selects the control pattern having the highest operation efficiency, based on the information related to the operation efficiency (that is, the estimated heat cost), the value related to a required amount for the energy (that is, the value=the preset temperature−the air-blowing temperature), and the output of the accessory device (that is, the amount for the heat of cooling). According to the above structure and operation, it is possible to select the control pattern having the highest operation efficiency, without using the threshold values, by taking into consideration the information for the operation efficiency of the accessory device, the value for the required energy amount of the accessory system, and the output of the accessory device.

More in detail, the accessory device 1 is composed of the compressor 1 for the A/C apparatus 15, while the accessory system 15 is composed of the A/C apparatus 15. The control-pattern selecting portion 81 selects the control pattern having the highest operation efficiency, based on:

the inverse number of the estimated heat cost (wherein the estimated heat cost corresponds to the information related to the operation efficiency), the deviation between the preset temperature and the air-blowing temperature of the A/C apparatus 15 (wherein the deviation corresponds to the value related to the required amount for the energy of the accessory system), and the amount for the heat of cooling (which corresponds to the output of the accessory device).

According to the above structure and operation, it is possible to select the control pattern having the highest operation efficiency, without using the threshold values, by taking into consideration the preset temperature and the air-blowing temperature of the A/C apparatus as well as the amount of the heat for cooling.

Further Embodiments or Modifications

The present disclosure should not be limited to the above embodiments or modifications but may be modified in various manners as below.

In the first embodiment, the vehicle control system (more exactly, the engine ECU) estimates the vehicle running condition related to the engine rotational speed, the engine torque and so on for the predetermined future time period (the predetermined estimation period) based on:

the information for the driver operation;

the information for the accessory operation;

the information for the vehicle running condition;

the information for the vehicle navigation;

the information for the vehicle traveling records, and so on.

For example, the vehicle control system receives the above information as numeric values, wherein the information includes:
- a stroke amount(s) of an acceleration pedal and/or a brake pedal;
- outputted electric current from the alternator;
- the current vehicle speed;
- the speed limit of the road, on which the vehicle is currently running;
- the condition for the traffic jam;
- the length of the sloping road;
- the inclination of the sloping road, and so on.

In a case that the estimated vehicle running condition is expressed not in the numeric values but in a probability, the above information may be also taken-in in a form of the probability. In addition, fuzzy control may be used for estimating the vehicle running condition.

When the threshold values are calculated, such threshold value which is deviated far from the past threshold values may be eliminated. As a result, it is possible to realize such a control reflecting the past records.

In addition, in the first embodiment, the capacity-variable compressor is used. A conventional compressor (having a fixed capacity) may be also used in the present disclosure, wherein the compressor is connected to the engine via a clutch so that the rotational force of the engine is selectively transmitted to the compressor. In the case of the compressor (the operation of which is switched on and off), the work volume of the compressor is increased when a ratio of a switch-on period with respect to the whole operating period of the compressor becomes larger, as in the same manner that the discharging capacity of the capacity-variable compressor is increased.

In the above first embodiment, the compressor-control pattern estimating portion (the CCP estimating portion 79) estimates multiple control patterns, as shown in FIG. 5. The control patterns may be calculated each time depending on the estimated vehicle running condition and the engine condition. Alternatively, the control patterns may be stored in advance in a memory device and any of the control patterns (depending on the vehicle running condition and the engine condition) may be readout from the memory device. Further alternatively, both of the calculated control pattern (s) and the read-out control pattern (s) may be evaluated and selected.

In the above case, the vehicle control system (the selecting portion 81) can select the most appropriate compressor-control pattern from the multiple control patterns memorized in the memory device, from multiple control patterns estimated (calculated) from time to time, or from the multiple control patterns including the control patterns memorized in the memory device and the control patterns calculated from time to time.

The amount of the cooling energy stored in the cool-storage device 40 may be calculated based on a map or by use of a formula, depending on the cool-storage temperature detected by the temperature sensor 33.

Alternatively, as disclosed in Japanese Patent Publication No. 2005-207321, the stored amount of the cooling energy may be calculated based on temperature of the air before passing through the cool-storage device and the temperature of the air having passed through the cool-storage device. Furthermore, the amount for the heat of cooling stored in the heat exchanger may be estimated based on a map depending on a change of the temperature of the air before and after the heat exchanger, when the operation of the compressor is stopped.

In the above embodiments, the cool-storage device 40 is provided in the A/C apparatus 15. However, since the heat of cooling can be stored in the heat exchanger (the evaporator 9) and in the other parts of the refrigerating cycle (for example, refrigerant pipes), the present disclosure can be applied to an A/C apparatus having no cool-storage device.

In the above embodiments, the compressor is connected to the engine via the pulley and belt, so that the compressor is directly driven by the engine. However, an electric-power generator may be provided to generate the electric power by use of the driving power of the engine. And an electrically-driven type compressor may be provided, so that the compressor is operated by the electric power generated by the electric-power generator.

In the above embodiments, the estimated heat cost (the inverse number of the cooling efficiency) is defined as the value related to the cooling efficiency, wherein the cooling efficiency is expressed by the ratio of the amount for the heat of cooling (which is generated by the cooling operation) with respect to the fuel consuming amount for driving the compressor so as to carry out the cooling operation. Namely, the value related to the cooling efficiency corresponds to the fuel consuming amount necessary for operating the compressor so as to generate the amount for the heat of cooling. It is, therefore, possible to use fuel consuming amount for each unit of time or each unit of engine torque, which is necessary to drive the compressor, as the value related to the cooling efficiency.

In the sixth embodiment, the multiple control patterns for the alternator are not calculated, but one appropriate control pattern is calculated. The sixth embodiment may be applied to the control for the compressor of the A/C apparatus.

In the seventh embodiment, the multiple control patterns for the A/C apparatus are calculated but the threshold values are not used. The seventh embodiment may be also applied to the control for the alternator.

The driving source should not be limited to the engine. For example, an electric motor for driving the vehicle may be used as the driving source. The electric motor is operated by electric power generated by, for example, fuel cells. The electric motor may be operated by the electric power charged in a battery. In the above case (the vehicle is driven by the electric motor), the term "the fuel consuming amount of the driving source" should be read as "an electric-power consuming amount of the battery". According to the above modification, the electric-power necessary for the driving source (the electric motor) can be saved.

In addition, the electric power generator should not be limited to the alternator but a direct-current generator may be also used in the present disclosure.

What is claimed is:
1. The A vehicle control system for controlling a driving source of a vehicle comprising:
   a processor for executing non-transitory portions comprising:
      a running-condition estimating portion for estimating a running condition of the vehicle for a predetermined estimation period based on information related to vehicle condition;
      a driving-amount calculating portion for calculating an amount of driving power necessary for the driving source in order to operate an accessory device with the driving power;
      an accessory-device controlling portion for controlling an operation of the accessory device; and
      a control-pattern calculating portion for calculating a control pattern for the accessory device and control- ling the accessory-device controlling portion in accordance with the control pattern,
wherein the control pattern is calculated based on:
(i) characteristic data showing a relationship between the driving power of the driving source and a fuel consuming amount;
(ii) information from the running-condition estimating portion; and
(iii) information from the driving-amount calculating portion;
wherein the fuel consuming amount of the driving source is minimized for the predetermined estimation period, when the accessory device is operated in accordance with the control pattern calculated by the control-pattern calculating portion;
wherein the control-pattern calculating portion is composed of:
a control-pattern estimating portion for estimating multiple possible control patterns;
a threshold-value calculating portion for calculating threshold values based on the information from the accessory-condition detecting portion for the condition of the accessory device or the accessory system, wherein the threshold values are related to the operation efficiency of the accessory device or the accessory system; and
a selecting portion for selecting one control pattern for the accessory device from the multiple possible control patterns based on the threshold value.

2. The vehicle control system according to claim 1, wherein
the selecting portion has a comparing section for comparing a value related to an operation efficiency of the accessory device for each of the multiple possible control patterns with the threshold value, and
the accessory device is operated in accordance with the selected control pattern in order to increase output of the accessory device, when the vehicle control system determines through the comparison between the value related to the operation efficiency of the accessory device and the threshold value that the fuel consuming amount becomes smaller in a case in which the accessory device is operated in accordance with the selected control pattern.

3. The vehicle control system according to claim 2, wherein
the comparing section selects the control pattern depending on a difference between the value related to the operation efficiency of the accessory device and the threshold value.

4. The vehicle control system according to claim 3, wherein
the comparing section calculates a first energy consuming amount necessary for operating the accessory device so that the accessory device is operated with such operation efficiency related to the threshold value,
the comparing section calculates a second energy consuming amount for each of the multiple possible control patterns, based on the value related to the operation efficiency of the accessory device,
the comparing section calculates a third energy consuming amount, which can be saved for each of the multiple possible control patterns, based on the first and second energy consuming amounts, and
the comparing section selects such control pattern, which has a maximum value for the third energy consuming amount which can be saved.

5. The vehicle control system according to claim 1, wherein
the threshold value is calculated based on at least one of:
an accumulated amount of energy outputted from the accessory device,
a vehicle condition related to use of energy outputted from the accessory device, and
environmental condition related to use of energy outputted from the accessory device.

6. The vehicle control system according to claim 1, wherein
the threshold-value calculating portion learns records related to energy outputted from the accessory device, so as to calculate the threshold values.

7. A vehicle control system for controlling a driving source of a vehicle comprising:
a processor for executing non-transitory portions comprising:
a running-condition estimating portion for estimating a running condition of the vehicle for a predetermined estimation period based on information related to vehicle condition;
a driving-amount calculating portion for calculating an amount of driving power necessary for the driving source in order to operate an accessory device with the driving power;
an accessory-device controlling portion for controlling an operation of the accessory device; and
a control-pattern calculating portion for calculating a control pattern for the accessory device and controlling the accessory-device controlling portion in accordance with the control pattern,
wherein the control pattern is calculated based on:
(i) characteristic data showing a relationship between the driving power of the driving source and a fuel consuming amount;
(ii) information from the running-condition estimating portion; and
(iii) information from the driving-amount calculating portion;
wherein the fuel consuming amount of the driving source is minimized for the predetermined estimation period, when the accessory device is operated in accordance with the control pattern calculated by the control-pattern calculating portion;
wherein the vehicle control system further comprises an accessory-condition detecting portion for detecting a condition of the accessory device or an accessory system;
wherein the driving-amount calculating portion is composed of an efficiency estimating portion for estimating operation efficiency of the driving source or an energy-consuming amount estimating portion for estimating an energy consuming amount of the driving source, based on the information from the running-condition estimating portion as well as a condition of the driving source;
wherein the control-pattern calculating portion calculates the control pattern for the accessory device based on:
(iv) the operation efficiency of the driving source estimated by the efficiency estimating portion or the energy consuming amount of the driving source estimated by the energy-consuming amount estimating portion; and
(v) information from the accessory-condition detecting portion for the condition of the accessory device or the accessory system, and wherein the energy consuming amount of the driving source is minimized for the predetermined estimation period, when the accessory device is operated in accordance with the control pattern;

wherein the control-pattern calculating portion is composed of:
- a provisional-work-volume calculating portion for calculating a provisional work volume of the accessory device based on:
  - the information from the accessory-condition detecting portion for the condition of the accessory device or the accessory system, and
  - the information from the driving-amount calculating portion for the operation efficiency of the driving source or the energy consuming amount of the driving source;
- an accessory-driving-power amount calculating portion for calculating a driving-power amount of the driving source necessary for operating the accessory device so as to generate the provisional work volume and for calculating the operation efficiency of the accessory device related to the provisional work volume; and
- a corrected work-volume calculating portion for correcting the provisional work volume of the accessory device by use of the operation efficiency of the accessory device, so as to calculate a corrected work volume of the accessory device as the control pattern.

8. The vehicle control system according to claim 7, wherein
- the efficiency estimating portion estimates the operation efficiency of the driving source for the predetermined estimation period, based on the information from the running-condition estimating portion as well as the condition of the driving source,
- an average value of the operation efficiency of the driving source is calculated by an average-value calculating portion for the predetermined estimation period,
- the provisional-work-volume calculating portion calculates the provisional work volume of the accessory device based on:
  - the operation efficiency of the driving source for the predetermined estimation period,
  - the average value of the operation efficiency of the driving source for the predetermined estimation period, and
  - the information from the accessory-condition detecting portion for the condition of the accessory system,
- the accessory-driving-power amount calculating portion calculates the driving-power amount of the driving source necessary for operating the accessory device so as to generate the provisional work volume and calculates the operation efficiency of the accessory device related to the provisional work volume, and
- the corrected work-volume calculating portion corrects the provisional work volume of the accessory device by use of the operation efficiency of the accessory device, so as to calculate the corrected work volume of the accessory device as the control pattern.

9. A vehicle control system for controlling a driving source of a vehicle comprising:
- a processor for executing non-transitory portions comprising:
  - a running-condition estimating portion for estimating a running condition of the vehicle for a predetermined estimation period based on information related to vehicle condition;
  - a driving-amount calculating portion for calculating an amount of driving power necessary for the driving source in order to operate an accessory device with the driving power;
  - an accessory-device controlling portion for controlling an operation of the accessory device; and
  - a control-pattern calculating portion for calculating a control pattern for the accessory device and controlling the accessory-device controlling portion in accordance with the control pattern,
- wherein the control pattern is calculated based on:
  - (i) characteristic data showing a relationship between the driving power of the driving source and a fuel consuming amount;
  - (ii) information from the running-condition estimating portion; and
  - (iii) information from the driving-amount calculating portion;
- wherein the fuel consuming amount of the driving source is minimized for the predetermined estimation period, when the accessory device is operated in accordance with the control pattern calculated by the control-pattern calculating portion;
- wherein the vehicle control system further comprises an accessory-condition detecting portion for detecting a condition of the accessory device or an accessory system,
- wherein the driving-amount calculating portion is composed of an efficiency estimating portion for estimating operation efficiency of the driving source or an energy-consuming amount estimating portion for estimating an energy consuming amount of the driving source, based on the information from the running-condition estimating portion as well as a condition of the driving source;
- wherein the control-pattern calculating portion calculates the control pattern for the accessory device based on:
  - (iv) the operation efficiency of the driving source estimated by the efficiency estimating portion or the energy consuming amount of the driving source estimated by the energy-consuming amount estimating portion; and
  - (v) information from the accessory-condition detecting portion for the condition of the accessory device or the accessory system, and
- wherein the energy consuming amount of the driving source is minimized for the predetermined estimation period, when the accessory device is operated in accordance with the control pattern;
- wherein the control-pattern calculating portion is composed of:
  - a control-pattern estimating portion for estimating multiple possible control patterns; and
  - a selecting portion for selecting one control pattern for the accessory device or the accessory system from the multiple possible control patterns based on:
    - the information from the accessory-condition detecting portion for the condition of the accessory device or the accessory system, and
    - the information for the operation efficiency of the accessory device or the accessory system
- wherein the selecting portion selects the control pattern based on:
  - the information for the operation efficiency,
  - a value related to a required energy amount of the accessory system, wherein the required energy amount corresponds to the information for the condition of the accessory system, and
  - output of the accessory device.

10. The vehicle control system according to claim 9, wherein
the accessory device is composed of a compressor of an air-conditioning apparatus, wherein the air-conditioning apparatus corresponds to the accessory system, and
the selecting portion selects the control pattern based on;
an inverse number of estimated heat cost, which corresponds to the information related to the operation efficiency,
a preset temperature and an air-blowing temperature of the air-conditioning apparatus, wherein the preset temperature and the air-blowing temperature are related to the required energy amount, and
an amount of heat of cooling, which corresponds to the output of the accessory device.

11. A vehicle control system for controlling a driving source of a vehicle comprising:
a processor for executing non-transitory portions comprising:
a running-condition estimating portion for estimating a running condition of the vehicle for a predetermined estimation period based on information related to vehicle condition;
a driving-amount calculating portion for calculating an amount of driving power necessary for the driving source in order to operate an accessory device with the driving power;
an accessory-device controlling portion for controlling an operation of the accessory device; and
a control-pattern calculating portion for calculating a control pattern for the accessory device and controlling the accessory-device controlling portion in accordance with the control pattern,
wherein the control pattern is calculated based on:
(i) characteristic data showing a relationship between the driving power of the driving source and a fuel consuming amount;
(ii) information from the running-condition estimating portion; and
(iii) information from the driving-amount calculating portion;
wherein the fuel consuming amount of the driving source is minimized for the predetermined estimation period, when the accessory device is operated in accordance with the control pattern calculated by the control-pattern calculating portion;
wherein a work-volume change-rate is set as such a value, which has an influence on drivability of the vehicle, or which has an influence on a life-time of the accessory device and/or the accessory system, and
the control pattern is decided depending on the work-volume change-rate.

12. A vehicle control system for controlling a driving source of a vehicle comprising:
a processor for executing non-transitory portions comprising:
a running-condition estimating portion for estimating a running condition of the vehicle for a predetermined estimation period based on information related to vehicle condition;
an engine-condition detecting portion for detecting an operating condition of an engine;
an efficiency estimating portion for estimating an engine efficiency based on the estimated running condition of the vehicle and the detected operating condition of the engine;
an average-value calculating portion for calculating an average value of the engine efficiency for the predetermined estimation period;
a battery-condition detecting portion for detecting an operating condition of a battery, which is charged with electric power generated by an alternator;
a provisional electric-power amount calculating portion for calculating a provisional value for electric power to be generated by the alternator based on the detected engine efficiency, the average value of the engine efficiency and the detected operating condition of the battery;
a driving-power amount calculating portion for calculating a driving-power amount necessary for operating the alternator so as to generate electric power equal to the provisional value for the electric power, the driving-power amount calculating portion further calculating operation efficiency for generating the electric power;
a correcting portion for correcting the provisional value for the electric power by use of the operation efficiency for generating the electric power, in order to calculate a control pattern for the alternator; and
a driving portion for operating the alternator in accordance with the calculated control pattern.

* * * * *